(12) United States Patent
Antonio, Jr. et al.

(10) Patent No.: US 12,046,160 B1
(45) Date of Patent: Jul. 23, 2024

(54) PEG ARRAY ASSEMBLIES, MOBILE APPS FOR USE THEREWITH, RELATED SYSTEMS INCLUDING THE SAME, AND RELATED METHODS

(71) Applicant: KiwiCo, Inc., Mountain View, CA (US)

(72) Inventors: Roberto Antonio, Jr., Pacifica, CA (US); Kimberly S. Smith, Sunnyvale, CA (US); Tony Tong, Elk Grove, CA (US)

(73) Assignee: KiwiCo, Inc., Mountain View, CA (US)

( * ) Notice: Subject to any disclaimer, the term of this patent is extended or adjusted under 35 U.S.C. 154(b) by 0 days.

(21) Appl. No.: 18/181,372

(22) Filed: Mar. 9, 2023

(51) Int. Cl.
| | |
|---|---|
| *G09G 3/34* | (2006.01) |
| *F21V 33/00* | (2006.01) |
| *G06F 3/0481* | (2022.01) |
| *G09F 13/34* | (2006.01) |
| *G09G 3/20* | (2006.01) |

(Continued)

(52) U.S. Cl.
CPC .......... *G09F 13/34* (2013.01); *F21V 33/0052* (2013.01); *G06F 3/0481* (2013.01); *G09G 3/2003* (2013.01); *A63H 33/22* (2013.01); *F21Y 2103/10* (2016.08); *F21Y 2115/10* (2016.08); *G09G 2320/0626* (2013.01); *G09G 2320/0666* (2013.01); *G09G 2354/00* (2013.01)

(58) Field of Classification Search
CPC .... G09F 13/34; F21V 33/0052; G06F 3/0481; G09G 3/2003; G09G 2320/0626; G09G 2320/0666; G09G 2354/00; F21Y 2103/10; F21Y 2115/10; A63H 33/22

USPC .......................................................... 345/84
See application file for complete search history.

(56) References Cited

U.S. PATENT DOCUMENTS

| | | |
|---|---|---|
| 3,530,615 A | 9/1970 | Meyer |
| 4,196,539 A | 4/1980 | Speers |

(Continued)

OTHER PUBLICATIONS

Lite Brite Ultimate Classic: https://shop.hasbro.com/en-us/product/lite-brite-ultimate-classic/A0579FDA-BDE1-4888-840A-1862576A318E; downloaded Mar. 6, 2023.

(Continued)

*Primary Examiner* — Jennifer T Nguyen
(74) *Attorney, Agent, or Firm* — Kolitch Romano Dascenzo Gates LLC

(57) ABSTRACT

A peg array assembly includes a housing having an opening and defining an internal volume. The assembly also includes a panel having an array of a plurality of apertures formed therethrough. Each aperture of the panel is configured to receive a respective light-transmitting peg and retain the respective light-transmitting peg until the respective light-transmitting peg is selectively removed from the respective aperture. The peg array assembly is configured to selectively receive a mobile device configured to emit light towards the array of the plurality of apertures. A mobile app may display a design template and/or an animation, and systems include the mobile app and the peg array assembly. Methods include accessing design templates and/or animation libraries via the mobile app, inserting light-transmitting pegs through the panel, and displaying a design and/or animation via the light-transmitting pegs and light emitted from the mobile device or other light source.

21 Claims, 13 Drawing Sheets

(51) Int. Cl.
    *A63H 33/22*     (2006.01)
    *F21Y 103/10*     (2016.01)
    *F21Y 115/10*     (2016.01)

(56) References Cited

U.S. PATENT DOCUMENTS

| | | | |
|---|---|---|---|
| 5,391,105 | A | 2/1995 | Jones |
| 5,664,860 | A | 7/1997 | Piper et al. |
| 6,238,261 | B1 | 5/2001 | Lang |
| 8,128,476 | B1 * | 3/2012 | Sidhu ............... A63F 3/00643 463/16 |
| 2006/0225327 | A1 * | 10/2006 | Peters ............... G09F 9/305 40/547 |
| 2015/0297950 | A1 * | 10/2015 | Ono ............... A63B 21/4027 482/8 |
| 2020/0294416 | A1 * | 9/2020 | Roh ............... G09B 7/00 |

OTHER PUBLICATIONS

Lite-Brite Mini-X Connect: https://www.target.com/p/lite-brite-mini-x-connect/-/A-86250745#lnk=sametab; downloaded Mar. 6, 2023.

\* cited by examiner

PEG ARRAY ASSEMBLIES, MOBILE APPS FOR USE THEREWITH, RELATED SYSTEMS INCLUDING THE SAME, AND RELATED METHODS

FIELD

The present disclosure relates generally to peg array assemblies having light-transmitting pegs for displaying an image or animation when light is directed through the light-transmitting pegs.

BACKGROUND

Conventional toy arts and crafts devices have been developed that utilize light transmitting pegs that are inserted into a pegboard to form various patterns or pictures, and a light source is located behind the pegboard that transmits light through the pegs to enhance the pattern or picture. The pegs typically are made from a transparent plastic tinted with a color and have a shaft portion and a head portion. In use, the shaft portion of the peg is inserted into an aperture in the pegboard so that the head portion remains positioned above the upper surface of the pegboard. The distal end of the shaft portion is often tapered or pointed, so that it can more easily pierce a dark-colored sheet of paper which may be positioned over the upper surface of the peg board. The sheet of paper generally includes a printed design showing markings for the location and color of pegs to be inserted to form a particular design. A light bulb is typically mounted within a housing of the device to illuminate the pegs and enhance the design. The dark-colored sheets of paper may be difficult or unpractical to re-use, as once the markings are perforated by poking the pegs through the paper, the markings may become difficult or impossible to see, and thus the sheet of paper may not be practical to aid in creating the same design again. Such conventional toy devices also may require frequent replacement of light bulbs, may be bulky or unwieldy to transport, and have limited capabilities in terms of what may be displayed.

SUMMARY

Peg array assemblies according to the present disclosure may include a housing and a panel comprising a plurality of apertures formed therethrough. The housing may include an opening, and the housing may define an internal volume. The plurality of apertures may be arranged in an array, with each aperture of the plurality of apertures being configured to receive a respective light-transmitting peg and retain the respective light-transmitting peg until the respective light-transmitting peg is selectively removed from the respective aperture. The panel may be positioned with respect to the housing such that the array of the plurality of apertures is configured to be accessible through the opening in the housing. The housing may be configured to selectively receive a mobile device configured to emit light towards the array of the plurality of apertures. Disclosed systems may include such a peg array assembly and a mobile application (referred to herein as a "mobile app") configured to control the intensity, brightness, and/or color of light emitted by the mobile device towards the panel.

Mobile apps configured for use on a mobile device positioned in a peg array assembly also are within the scope of the present disclosure. The mobile app may be configured to access an animation library and/or a design template library from a remote location. The mobile app further may be configured to receive a user selection designating a user-selected animation from among a plurality of animations of the animation library, and/or a user-selected template from among a plurality of templates of the design template library. The mobile app also may be configured to display the user-selected animation and/or the user-selected design template on a screen of the mobile device.

Disclosed methods may include providing a mobile app for use on a mobile device configured for use in a peg array assembly according to the present disclosure. Such methods may further include detecting an internet location via the mobile app run on the mobile device, accessing a template library from a remote location, and/or accessing an animation library from a remote location, via the mobile app. The mobile app may include a template mode in which the mobile app is configured to display a design template in the template mode, and an animation mode in which the mobile app is configured to display an animation. Disclosed methods also may include receiving a user selection designating a user-selected template from among a plurality of design templates of the template library, via the mobile app, and displaying the user-selected template on a screen of the mobile device, via the mobile app, wherein the displaying the user-selected template comprises displaying a suggested placement of a plurality of light-transmitting pegs. Additionally or alternatively, disclosed methods may include receiving a user selection designating a user-selected animation from among a plurality of animations of the animation library, via the mobile app, and displaying the user-selected animation on the screen of the mobile device.

Methods of using peg array assemblies also are within the scope of the present disclosure. For example, methods may include removing a plurality of light-transmitting pegs from an internal volume of a disclosed peg array assembly, inserting a plurality of respective light-transmitting pegs through a respective slit of an elastomeric sheet and through a respective aperture of a panel, and directing light towards the bottom of the light-transmitting pegs (e.g., towards a lower surface of the panel), such that light is transmitted through the plurality of respective light-transmitting pegs and visible through an opening of a housing of the peg array assembly. Directing light towards the lower surface of the panel to illuminate the light-transmitting pegs may be accomplished via a mobile device received and supported by the housing of the peg array assembly, and/or by a different light source coupled to, positioned in, and/or supported by the housing of the peg array assembly.

DESCRIPTION

Figure 1:
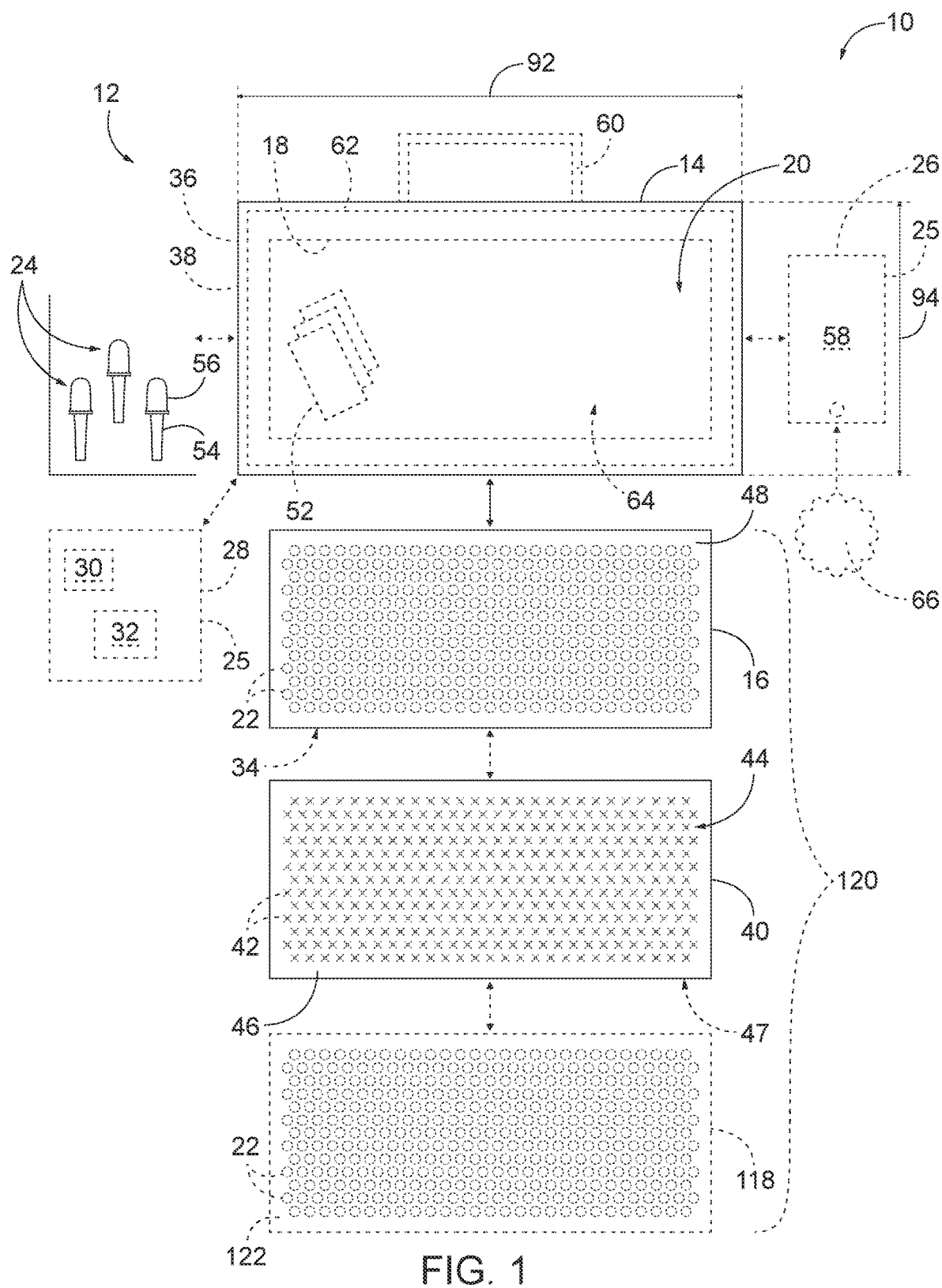
FIG. 1 is a schematic representation of non-exclusive examples of systems including a presently disclosed peg array assembly.

FIG. 1 provides illustrative, non-exclusive examples of systems 10 including a peg array assembly 12 according to the present disclosure. Peg array assembly 12 is generally configured to be portable (and thus may be referred to herein as a portable peg array assembly 12), though disclosed peg array assemblies 12 are not limited to the same. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure. The elements of system 10 and peg array assembly 12 in FIG. 1 are not drawn to scale.

Peg array assembly 12 generally includes a housing 14 and a panel 16. In some examples, housing 14 has an opening 18, and defines an internal volume 20. Panel 16 includes a plurality of apertures 22 formed therethrough. Apertures 22 are arranged in an array of any desired number of apertures 22. Each aperture 22 is configured to receive a respective light-transmitting peg 24, and is further configured to retain the respective light-transmitting peg 24 until said light-transmitting peg 24 is selectively removed from the respective aperture 22. In some examples, housing 14 is configured to serve as a travel case to lend portability to a portable peg array assembly 12, with the components of portable peg array assembly 12 all being capable of being contained within housing 14 for carrying or transport, such that a self-contained unit is created.

Peg array assembly 12 is configured such that panel 16 is positioned with respect to housing 14 such that the array of apertures 22 is accessible. For example, panel 16 may be integrally formed with a portion of housing 14. In some examples, apertures 22 are accessible through opening 18. In this manner, one or more light-transmitting pegs 24 may be inserted through respective apertures 22 of panel 16 while panel 16 is secured with respect to, and/or positioned within, housing 14. Opening 18 may have a footprint that is at least as large as a footprint of the array of apertures 22, such that all of apertures 22 may be accessible though opening 18 for placement of light-transmitting pegs 24 into panel 16, removal of light-transmitting pegs 24 from panel 16, and/or viewing of light-transmitting pegs 24 that are retained by panel 16 in a given configuration. Opening 18 may be relatively large, such that it is sized to encompass a significant portion of a footprint, or profile, of housing 14. For example, opening 18 may extend continuously across at least 50% of a length 92 of housing 14, at least 60% of length 92 of housing 14, at least 70% of length 92 of housing 14, at least 80% of length 92 of housing 14, at least 90% of length 92 of housing 14, and/or at least 95% of length 92 of housing 14. Additionally or alternatively, opening 18 may extend continuously across at least 50% of a width 94 of housing 14, at least 60% of width 94 of housing 14, at least 70% of width 94 of housing 14, at least 80% of width 94 of housing 14, at least 90% of width 94 of housing 14, and/or at least 95% of width 94 of housing 14.

When light is transmitted through light-transmitting pegs 24 that are retained by panel 16, the visual effect of the shape, pattern, or design of the light-transmitting pegs 24 may be enhanced. Light may be provided through light-transmitting pegs 24 via a plurality of different types of light sources 25 or devices. For example, housing 14 is configured to selectively receive a mobile device 26, with said mobile device 26 being configured to emit light towards the array of the plurality of apertures 22 (thus mobile device 26 is an example of light source 25). Mobile device 26 may be, for example, a mobile phone, a tablet, or other mobile device capable of emitting light. In use, mobile device 26 may be placed under panel 16, such as by being placed into internal volume 20, while being used to transmit light through light-transmitting pegs 24 inserted through apertures 22 of panel 16. Then, mobile device 26 may be selectively removed when the user is finished using peg array assembly 12. Mobile device 26 may be inserted into or positioned under panel 16 and/or in internal volume 20 in any suitable fashion. For example, mobile device 26 may be inserted into housing 14 through opening 18, may be slid into housing 14 from an opening or slot in the side of housing 14, two or more components of housing 14 may be opened, or separated, to receive mobile device 26, one or more components of peg array assembly 12 may be removed from housing 14 to make space to place mobile device 26, and/or housing 14 may be hinged open to selectively receive mobile device 26. In some examples, mobile device 26 may simply rest within housing 14, such as on a lip or flange configured to position it a desired distance from a lower panel surface 34 of panel 16. In some examples, mobile device 26 may be coupled to (e.g., within) housing 14 when used as a light source, and/or otherwise may be secured with respect to housing 14. In some examples, mobile device 26 may be placed in a lid, or cover 62, of peg array assembly 12, with panel 16 being positioned above mobile device 26 while in use. Peg array assembly 12 may be configured such that mobile device 26 is spaced away from the bottom of panel 16 (e.g., lower panel surface 34) when used to emit light towards panel 16, such as to accommodate the portion of light-transmitting pegs 24 extending below lower panel surface 34 when light-transmitting pegs 24 are inserted through apertures 22 of panel 16. For example, cover 62 and/or housing 14 may include edge and/or corner stands or features that are configured to elevate panel 16 above mobile device 26 when in use.

In some examples, peg array assembly 12 includes a light and battery assembly 28 configured to be selectively and removably positioned within internal volume 20. Light and battery assembly 28 may be configured to be selectively removed from internal volume 20 without damaging peg array assembly 12. For example, housing 14 may include a lip or ledge to support mobile device 26 or light and battery assembly 28 within internal volume such that mobile device 26 or light and battery assembly 28 may simply be placed, or seated, into housing 14. Housing 14 may be sized and shaped to support and position mobile device 26 or light and battery assembly 28 in such a way that light from the respective light source 25 may be directed towards the bottom of light-transmitting pegs 24, or generally towards panel 16 and light-transmitting pegs 24 inserted therethrough. Additionally or alternatively, cover 62 may be sized and shaped to support and position mobile device 26 or light and battery assembly 28 in such a way that light from the respective light source 25 may be directed towards panel 16 and light-transmitting pegs 24 inserted therethrough. Light and battery assembly 28 may be configured to house a light source 30 (which is an example of light source 25) configured to emit light towards the array of the plurality of apertures 22, and/or a battery 32 configured to power light source 30. For example, light source 30 may be or include one or more LEDs, such as LED strips extending along light and battery assembly 28. In some examples, light and battery assembly 28 may be configured to receive power from an external source (e.g., by being plugged in via an AC adaptor) in addition to or instead of including battery 32.

In some examples, housing 14 or cover 62 is configured to selectively receive mobile device 26 only when light and battery assembly 28 is not positioned within housing 14 or cover 62. In other words, in examples including light and battery assembly 28, said light and battery assembly 28 may be selectively interchangeable with mobile device 26 such that either light and battery assembly 28 or mobile device 26 may be positioned within cover 62 or within internal volume 20 of housing 14 to emit light towards apertures 22 and light-transmitting pegs 24 inserted therethrough. Additionally or alternatively, light source 25 may be operated and controlled using a programmable chip, or microcontroller. The variety of options for emitting light and controlling light emitted through light-transmitting pegs 24 enables a variety of functions of presently disclosed peg array assemblies 12, including animating designs via light-transmitting pegs 24. In some examples, educational information may be conveyed using disclosed peg array assemblies 12, such as information regarding color and light mixing properties.

Peg array assembly 12 also may include an elastomeric sheet 40 having a plurality of slits 42 formed therethrough, with each respective slit 42 being configured to receive a respective light-transmitting peg 24. Similar to apertures 22, slits 42 of elastomeric sheet 40 may be arranged in an array and may be sized and positioned to at least substantially align with the plurality of apertures 22 formed through panel 16. In other words, each respective slit 42 may be at least substantially aligned with a respective aperture 22 of panel 16 such that when a respective light-transmitting peg 24 is inserted through a respective corresponding slit 42 and aperture 22, a longitudinal axis 50 (see FIG. 4) of the respective light-transmitting peg 24 may be at least substantially perpendicular to an upper panel surface 48 of panel 16 (e.g., each light-transmitting peg 24 may be configured to be inserted substantially vertically through a respective slit 42 of elastomeric sheet 40 and through a respective aperture 22 of panel 16 when housing 14 is resting such that a plane of opening 18 is perpendicular to the direction of gravity, with the vertical direction being aligned with the direction of gravity). Thus, when a respective light-transmitting peg 24 is inserted through a respective slit 42 of elastomeric sheet 40, it may be correctly positioned, or aligned, to be further inserted through a respective aperture 22 as well. In this manner, peg array assembly 12 is configured to receive a plurality of light-transmitting pegs 24, with each light-transmitting peg optionally extending through a respective slit 42 of elastomeric sheet 40 and further extending through a respective aperture 22 of panel 16. Slits 42 may be biased closed, such that when a respective light-transmitting peg 24 is removed from a respective slit 42, the respective slit 42 closes back together such that elastomeric sheet 40 is configured to substantially block light from passing through slits 42 that do not have a light-transmitting peg inserted therethrough. In other words, slits 42 may be self-healing (or self-sealing) in that they close up once a respective light-transmitting peg 24 is removed from a respective slit 42. In this manner, elastomeric sheet 40 is configured to be reused a plurality of times while being configured to prevent a degradation in performance or light-blocking functionality.

In some examples, elastomeric sheet 40 is free from indicia on at least a portion 44 of an upper sheet surface 46 of elastomeric sheet 40 that is visible through opening 18 of housing 14 when elastomeric sheet is positioned within internal volume 20. In other examples, elastomeric sheet 40 may include indicia on upper sheet surface 46. Elastomeric sheet 40 may be configured to be positioned on upper panel surface 48 of panel 16 (e.g., with face-sharing contact between a lower surface 47 of elastomeric sheet 40 and upper panel surface 48 of panel 16). Alternatively, elastomeric sheet 40 may be configured to be positioned adjacent lower panel surface 34, and sandwiched between panel 16 and a second panel 118.

In some examples, elastomeric sheet 40 is configured to at least substantially prevent light from passing through elastomeric sheet 40 except through one or more light-transmitting pegs 24 inserted through one or more respective slits 42 of elastomeric sheet 40. In other words, elastomeric sheet 40 may be formed of a dark, opaque, and/or light-blocking material, such that it blocks light from light source 25 (when panel 16 is positioned between light source 25 and elastomeric sheet 40) from passing through except in areas where a respective light-transmitting peg 24 is inserted. For example, elastomeric sheet 40 may be a black rubber, silicone, or plastic sheet. In other examples, elastomeric sheet 40 may be at least partially transparent or semi-transparent, such as to enable viewing of a design template displayed on mobile device 26. Some examples of peg array assembly 12 may include two or more elastomeric sheets 40 having varying configurations, such as including one opaque elastomeric sheet 40 and one transparent elastomeric sheet 40. Slits 42 may be any suitable size or shape, but generally are configured to receive a respective light-transmitting peg snugly therethrough, such that it minimizes the passage of light around edges of light-transmitting pegs 24.

Each slit 42 may be configured to be fully closed in a resting configuration without external forces on elastomeric sheet 40, such that light is substantially blocked by elastomeric sheet 40 in examples of opaque elastomeric sheets 40, even in the areas of slits 42, when no light-transmitting peg 24 is positioned through a given slit 42. In other words, each slit 42 may be formed by a thin cut through elastomeric sheet 40 that enables the material of elastomeric sheet 40 to be in contact with itself on either side of a respective slit 42 when no light-transmitting peg 24 is inserted through the respective slit 42. In a specific example of elastomeric sheet 40, slits 42 may be X-shaped, though the present disclosure is not limited to the same. Each respective slit 42 may be spaced apart from each other slit 42 such that no one respective slit 42 touches another respective slit 42 of elastomeric sheet 40. This arrangement may help secure or orient light-transmitting pegs 24 in the desired arrangement, though if desired, elastomeric sheets 40 may be provided with one or more slits 42 touching or overlapping one another.

In some examples, peg array assembly 12 includes second panel 118, also including apertures 22 that align with apertures 22 of panel 16. When assembled, elastomeric sheet 40 may be sandwiched between panel 16 and second panel 118 (e.g., elastomeric sheet 40 may have face-sharing contact with lower panel surface 34 of panel 16 and a second upper panel surface 122 of second panel 118). In specific examples, panel 16 and second panel 118 may be formed of different materials. For example, panel 16 may be formed of wood in some examples, and second panel 118 may be formed of a clear plastic material. Panel 16, elastomeric sheet 40, and second panel 118 may be coupled together to form a panel subassembly 120, such that panel subassembly 120 may be moved as a unit to be placed into housing 14 or cover 62 for use and/or storage.

Peg array assemblies 12 may include one or more templates 52 (also referred to herein as design templates 52). Each template 52 may convey a suggested design for placement of a plurality of light-transmitting pegs 24. For example, each template 52 may include indicia printed thereon that indicates the suggested location and/or color of placings for a plurality of light-transmitting pegs 24. Templates 52 may be selectively used as desired, or users may create their own designs or patterns without using templates 52. When used, a template 52 may be positioned above panel 16 and above elastomeric sheet 40 (e.g., on upper sheet surface 46), such that when a user positions a respective light-transmitting peg 24 according to the indicia on the template 52, light-transmitting peg 24 extends through template 52, through a respective aperture 22 of panel 16, and through a respective slit 42 of elastomeric sheet 40 (and optionally through a respective aperture 22 of second panel 118). In various examples, templates 52 may include a perforation, aperture, slit, or thinned or weakened area corresponding to the locations where the template suggests placing a respective light-transmitting peg 24. While not illustrated in the schematic representation in FIG. 1, in some examples, templates 52 include a plurality of template apertures 116, with each respective template aperture 116 being aligned with a corresponding respective aperture 22 of panel 16. Thus, when a user inserts a light-transmitting peg 24 through a respective template aperture 116 of template 52, the light-transmitting peg 24 is properly aligned to continue through the corresponding aperture 22 of panel 16. In some examples, template 52 may include template apertures 116 only for the portion of apertures 22 that are needed for the particular design portrayed on the respective template 52. In some examples, template 52 may include a respective template aperture 116 for each respective aperture 22 of panel 16, even if not all template apertures 116 are used in a particular design. Template apertures 116 are illustrated and further discussed in connection with FIGS. 6 and 12-13. Additionally or alternatively, light-transmitting pegs 24 may be configured to pierce through template 52 when placed according to the indicia on the template 52. Templates 52 may be configured for one-time use or may be configured to be re-used a plurality of times. Templates 52 may have indicia corresponding to any desired design, which may include images, patterns, scenes, letters, numbers, and/or symbols. For example, a respective colored ring may be printed on template 52 and encircle each respective template aperture 116 to indicate which color of light-transmitting peg 24 should be inserted through the respective template aperture 116 for a particular design. For example, a red circle, or ring, may be printed surrounding a respective template aperture 116 to indicate that a red light-transmitting peg 24 should be inserted through that respective template aperture 116. In some examples, templates 52 are configured to be contained and stored within internal volume 20 of housing 14.

Peg array assembly 12 may include a plurality of light-transmitting pegs 24. At least some of light-transmitting pegs 24 may be substantially clear and/or colorless. Additionally or alternatively, at least some of light-transmitting pegs 24 may be of different colors, though generally light-transmitting pegs 24 are translucent or transparent such that they are configured to transmit light. In some examples, all of light-transmitting pegs 24 are substantially colorless, with color effects optionally being created by emitting different colors of light in different areas of mobile device 26 or light and battery assembly 28. For example, mobile device 26 may be used to create pixelated lighting in different colors in different locations of the device screen in order to create a multi-colored design or animation using clear or colorless light-transmitting pegs 24. Additionally or alternatively, light-transmitting pegs 24 and light emitted from mobile device 26 may be configured to create color mixing effects, where a first color of light may be directed towards a respective light-transmitting peg of a second color to create a visual effect of a third color in the resulting display. For example, mobile device 26 may be configured to direct yellow light through a blue light-transmitting peg to effectively display a green pixel. Mobile device 26 may be configured to emit changing colors of lights through colored or colorless light-transmitting pegs 24 to create animations and/or different designs or appearances.

Each light-transmitting peg 24 includes a tapered shaft portion 54 and a head portion 56. Tapered shaft portion 54 is configured to be selectively and removably inserted through a respective slit 42 of elastomeric sheet 40 and through a respective aperture 22 of panel 16. Tapered shaft portion 54 is configured such that the further a respective light-transmitting peg 24 is inserted along its longitudinal axis 50 into aperture 22, the tighter the engagement becomes between aperture 22 and tapered shaft portion 54 due to the increase in diameter of tapered shaft portion 54 closer to head portion 56. In some examples, light-transmitting pegs 24 may be snapped into place within apertures 22 due to the size and shape of tapered shaft portion 54 with respect to the diameter of apertures 22. Additionally or alternatively, light-transmitting pegs 24 may be configured to be inserted longitudinally through apertures 22 until head portion 56 contacts elastomeric sheet 40 or panel 16, thereby preventing further insertion of tapered shaft portion 54 into aperture 22. In other words, head portion 56 is sized with respect to apertures 22 such that head portion 56 is configured to prevent insertion of the head portion through the respective aperture 22 of panel 16. In this manner, head portion 56 is configured to remain above upper sheet surface 46 of elastomeric sheet 40 and upper panel surface 48 of panel 16, such that each head portion 56 is visible through opening 18 of housing 14 when light-transmitting peg 24 is inserted through the respective aperture 22 of panel 16. Light-transmitting pegs 24 may be stored in internal volume 20 of housing 14 when not in use (e.g., when not inserted through apertures 22 of panel 16). As apparent to those in the art, light-transmitting pegs 24 may be inserted into panel 16 in any desired pattern or design so as to form words, pictures, or combinations thereof in one color or in a plurality of different colors. Due to the manner in which light-transmitting pegs 24 are inserted into and removed from apertures 22 of panel 16, the design or arrangement of light-transmitting pegs 24 may be selectively changed quickly and easily, as desired.

Housing 14 and/or cover 62 may provide a structure or framework to support components of system 10 with respect to one another. For example, when peg array assembly 12 is oriented such that opening 18 is adjacent an upper side of peg array assembly 12, panel 16 may be positioned beneath opening 18. In some examples, panel 16 may be adjacent the upper side of peg array assembly 12 (or form the upper side), such as in examples without opening 18. In another arrangement, panel 16 (or panel subassembly 120) may be positioned within cover 62, with opening 18 facing up. In either arrangement, light source 25 (e.g., mobile device 26 or light source 30 of light and battery assembly 28) may be positioned underneath panel 16 facing lower panel surface 34 of panel 16. Thus, light source 25 may be configured to emit light towards lower panel surface 34 of panel 16 when the components are arranged in this manner. In other words, disclosed peg array assemblies 12 may be configured to support mobile device 26 such that light emitted from a screen, or display, 58 of mobile device 26 is directed towards lower panel surface 34 of panel 16 and through the plurality of apertures 22 of panel 16. In some examples, peg array assembly 12 includes an adjustment mechanism 64 configured to be selectively adjusted to configure peg array assembly 12 to receive a plurality of different sizes of mobile devices 26. For example, adjustment mechanism 64 may include sliders, elastic materials, and/or other mechanisms to enable a secure fit within housing 14 for a plurality of different sizes of mobile devices 26.

In some examples, housing 14 is a multi-part housing 14. For example, housing 14 may include an upper housing 36 and a lower housing 38. Additionally or alternatively, housing 14 may include a handle 60 configured to allow or facilitate peg array assembly 12 to be carried as a singular self-contained unit, thus configuring peg array assembly 12 to be a portable peg array assembly 12. Additionally or alternatively, housing 14 may include cover 62, which may be a selectively removable and replaceable cover 62. Cover 62 may be configured to selectively close, or cover, opening 18 of housing 14, and/or to selectively enclose panel 16, thereby selectively enclosing internal volume 20 between cover 62 and housing 14. For example, cover 62 may be configured to snap onto housing 14 or may engage housing 14 via a latch or other fastener or mechanism. In some examples, cover 62 is translucent or transparent, such that light-transmitting pegs 24 inserted through apertures 22 of panel 16 may be visible through cover 62 even when housing 14 is in this closed configuration for transport. Thus, cover 62 and housing 14 may be sized and shaped with respect to one another such that when cover 62 is engaged with housing 14, cover 62 is configured to accommodate a plurality of light-transmitting pegs 24 inserted through panel 16, such that cover 62 is configured to be selectively placed onto housing 14 without needing to remove the plurality of light-transmitting pegs 24 from panel 16. In some examples, handle 60 may be coupled to cover 62, such that cover 62 comprises handle 60. In some examples, peg array assembly 12 is configured to be used by removing cover 62 and placing panel 16 (or panel subassembly 120) and light source 25 (e.g., light and battery assembly 28 or mobile device 26) in cover 62. In this arrangement, templates 52 and/or light-transmitting pegs 24 may be accessed from within housing 14 and placed onto panel 16 or into apertures 22. In some examples, panel subassembly 120 is coupled to upper housing 26, thereby forming a subassembly 74 (see FIG. 3) that may be placed into cover 62 while light-transmitting pegs 24 are inserted.

Systems 10 also may include a mobile app 66 for use on mobile device 26 while positioned in peg array assembly 12 and/or while outside of peg array assembly 12. As used herein, mobile app 66 includes mobile applications ("apps"), websites, and web apps. For example, mobile app 66 may be configured to control the intensity, brightness, and/or color of light emitted by mobile device 26 towards panel 16 when used as light source 25 within housing 14. In some examples, mobile app 66 is configured to control and emit different light and/or sounds having different characteristics at different points in time and/or in different locations of mobile device 26, such that mobile app 66 is configured to work together with mobile device 26 and a plurality of light-transmitting pegs 24 to create an animated display viewable through the upper side (e.g., opening 18) of housing 14 that optionally may include sound effects played though mobile app 66 along with the visual animation created by light emitted from mobile device 26 as controlled by mobile app 66. Mobile app 66 may be stored on non-transitory computer readable memory of a processing unit of mobile device 26 in some examples.

Mobile app 66 generally is configured to receive and/or detect an internet location. Mobile app 66 may be configured to retrieve and/or access an animation library from a remote location (e.g., a cloud-based animation library, or an animation stored on a remote server), and/or to retrieve and/or access a design template library from a remote location (e.g., a cloud-based design template library, or a design template library stored on a remote server). Said animation library generally will include a plurality of animations, and/or sounds, sound effects, and/or music to accompany the animations. Similarly, said design template library will generally include a plurality of design templates. Via mobile app 66, users may select one or more desired animations and/or sounds, and/or one or more selected design templates from the respective library or libraries accessed by mobile app 66. To this end, mobile app 66 may be configured to receive a user selection designating a user-selected animation from among a plurality of animations of the animation library, and/or configured to receive a user selection designating a user-selected template from among a plurality of design templates of the design template library.

In some examples, mobile app 66 is configured to download one or more design templates from the design template library, and/or to download and/or stream one or more animations and/or sounds from the animation library, for later use (e.g., offline use). In some examples, mobile app 66 is configured to enable the user to add their own custom music, sounds, or sound effects to animations. Additionally or alternatively, mobile app 66 may include one or more animations, and/or one or more design templates stored locally on mobile device 26 that includes mobile app 66. Once a user selects an animation (or a design template), whether from local storage on mobile device 26 or from a remote location, mobile app 66 generally is configured to display the user-selected animation (or the user-selected design template) on screen 58 of mobile device 26, and/or mobile app 66 may play a selected sound or music file via a speaker of mobile device 26. Mobile app 66 also may be configured to receive a plurality of user-selected settings such as relating to duration, brightness, color, or timing for displaying the user-selected animation and/or design template. In some examples, mobile app 66 has an animation mode and a template mode. In the animation mode, mobile app 66 is configured to display an animation, whereas in the template mode, mobile app 66 is configured to display design template 52 on screen 58, which may display a suggested placement of a plurality light-transmitting pegs.

Turning now to FIGS. 2-7, illustrative non-exclusive examples of portable peg array assemblies 12 and/or components thereof are illustrated. Where appropriate, the reference numerals from the schematic illustration of FIG. 1 are used to designate corresponding parts in FIGS. 2-7; however, the examples of FIGS. 2-7 are non-exclusive and do not limit portable peg array assemblies 12 to the illustrated examples of FIGS. 2-7. That is, portable peg array assemblies 12 are not limited to the specific examples illustrated in FIGS. 2-7 and may incorporate any number of the various aspects, configurations, characteristics, properties, etc. that are illustrated in and discussed with reference to the schematic representation of FIG. 1 and/or the examples of FIGS. 2-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each of FIGS. 2-7; however, it is within the scope of the present disclosure that the previously discussed features, variants, etc. may be utilized therewith. In FIGS. 2-7, surfaces depicted as contacting each other may be in direct contact with each other.

Figure 2:
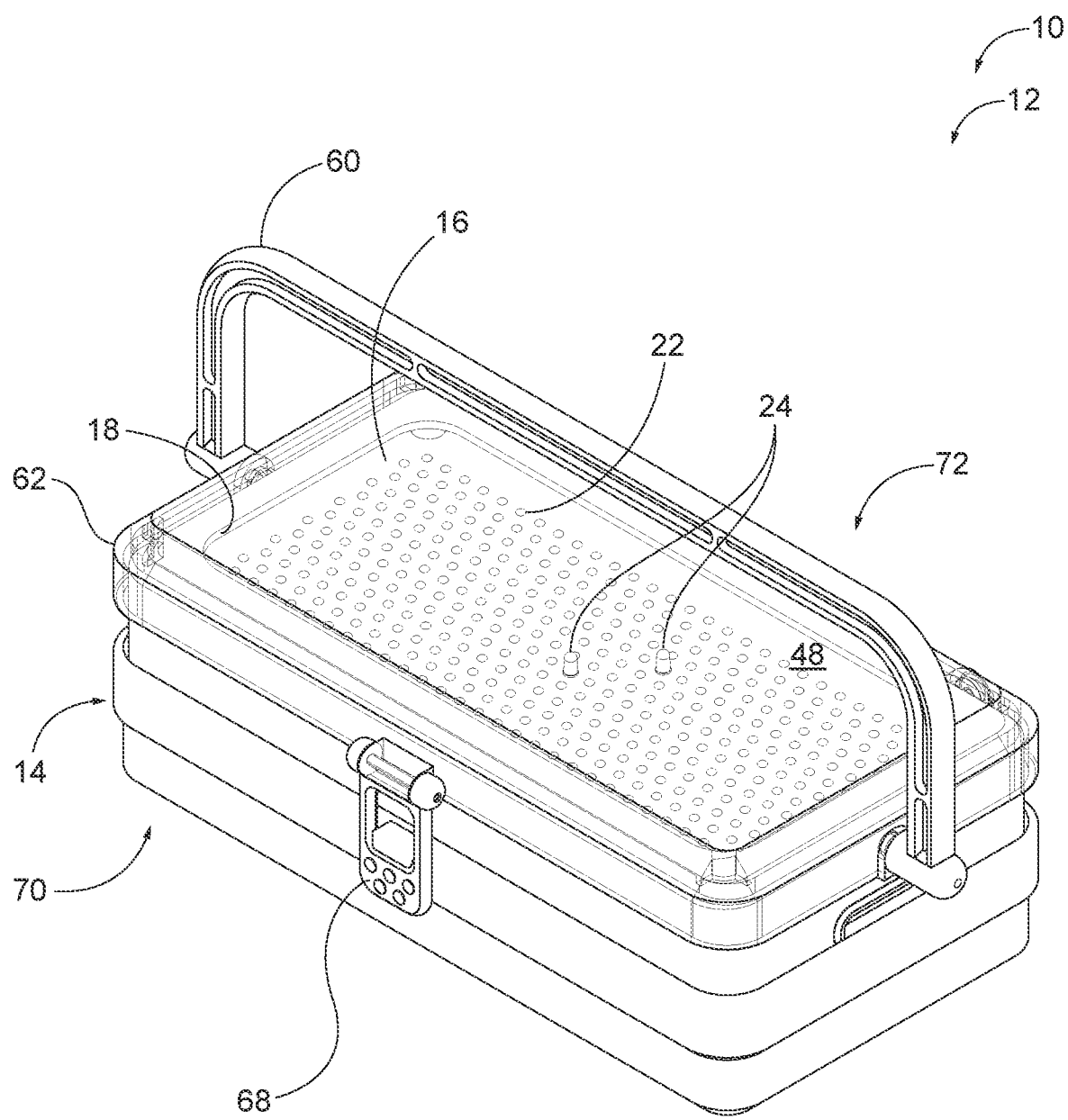
FIG. 2 is a perspective view of an example of a portable peg array assembly according to the present disclosure.

FIG. 2 illustrates an example of portable peg array assembly 12 that includes cover 62, handle 60 coupled to cover 62, and a latch 68 for securing housing 14 closed, and/or for securing cover 62 to housing 14. In the example of FIG. 2, at least a portion of cover 62 is transparent, such that opening 18, panel 16, and any light-transmitting pegs 24 inserted through apertures 22 are visible through cover 62. In use, more, or even all, of apertures 22 may have a respective light-transmitting peg inserted therethrough. In the example of FIG. 2, handle 60 may be rotated with respect to housing 14, such that handle 60 may be positioned in an upright position (as shown in FIG. 2) when in transit (e.g., while portable peg array assembly 12 is being carried via handle 60, and thus portable peg array assembly 12 is positioned below handle 60 due to the force of gravity acting on housing 14). When desired, handle 60 of this example may be movable with respect to housing 14, such as by being rotated to a front side 70 or a back side 72 of housing 14. This positioning may be desirable for viewing of the light-transmitting pegs 24 through cover 62. FIG. 2 may be said to illustrate portable peg array assembly 12 in a closed configuration, suitable for transport or carrying, with components of portable peg array assembly 12 contained within housing 14 and cover 62.

Figure 3:
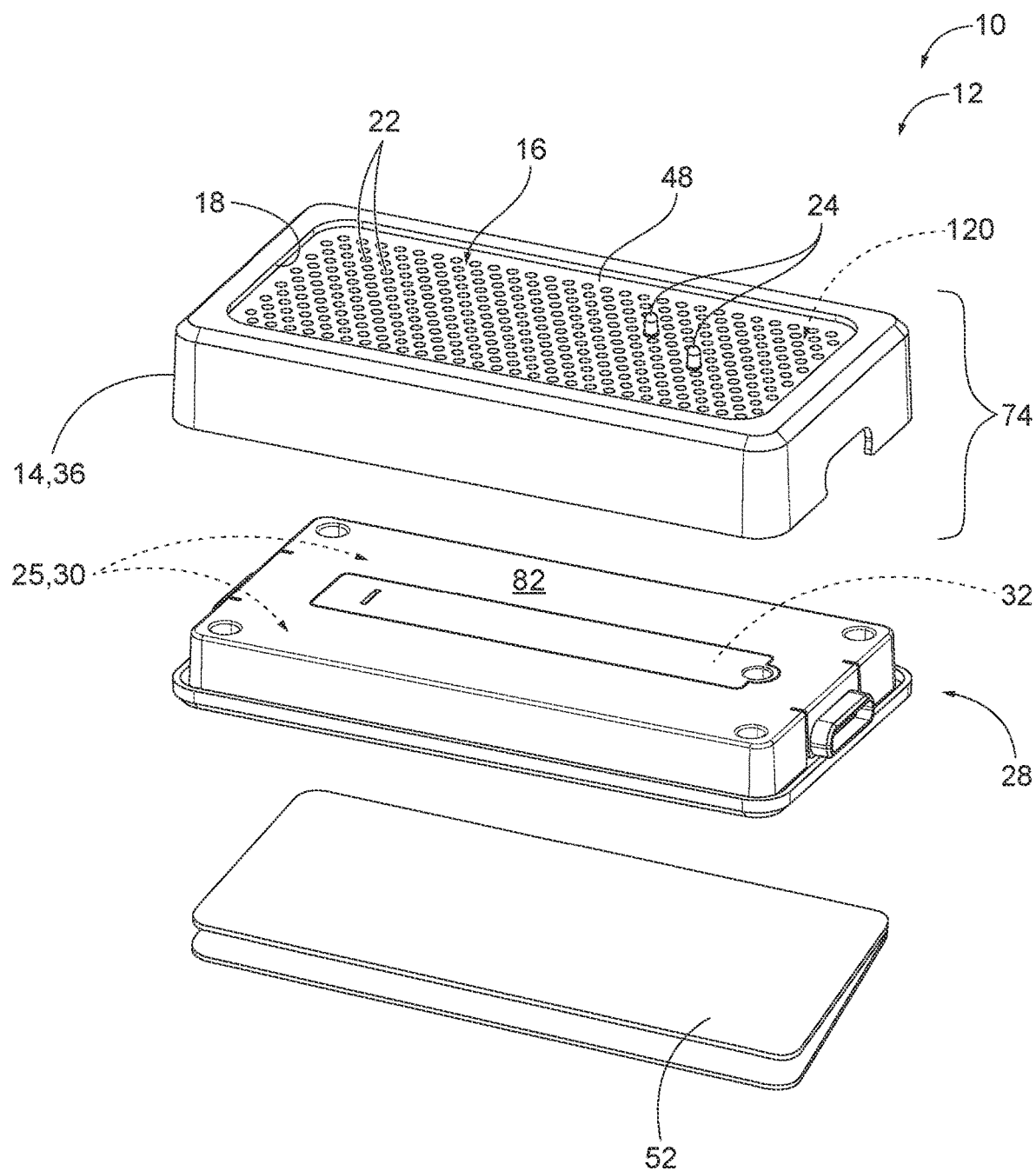
FIG. 3 is a partially exploded view of subassembly components of the portable peg array assembly of FIG. 2.
Figure 12:
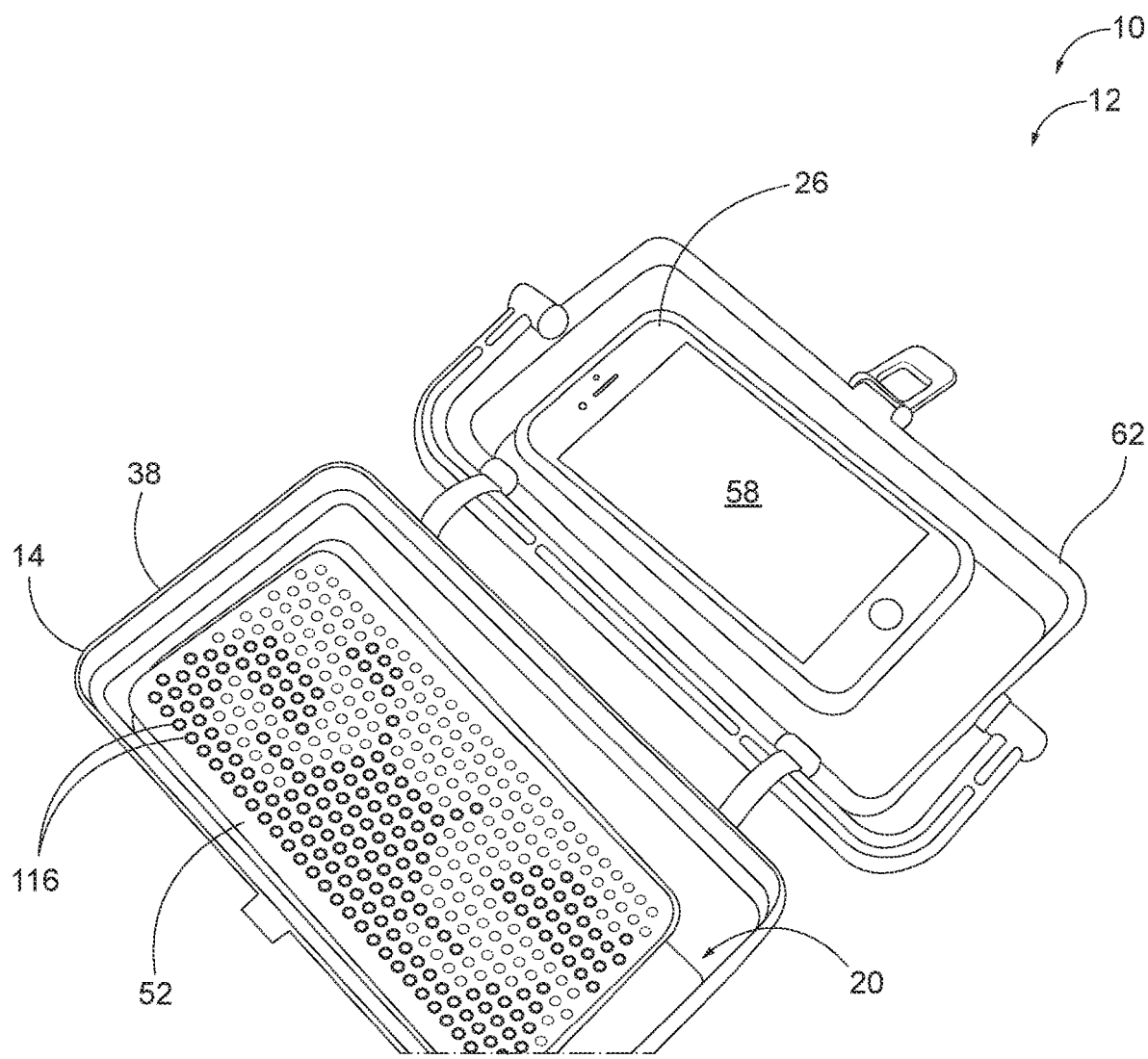
FIG. 12 is a top perspective view of an example of a disclosed peg array assembly, shown hinged open with a mobile device placed in the cover.
Figure 13:
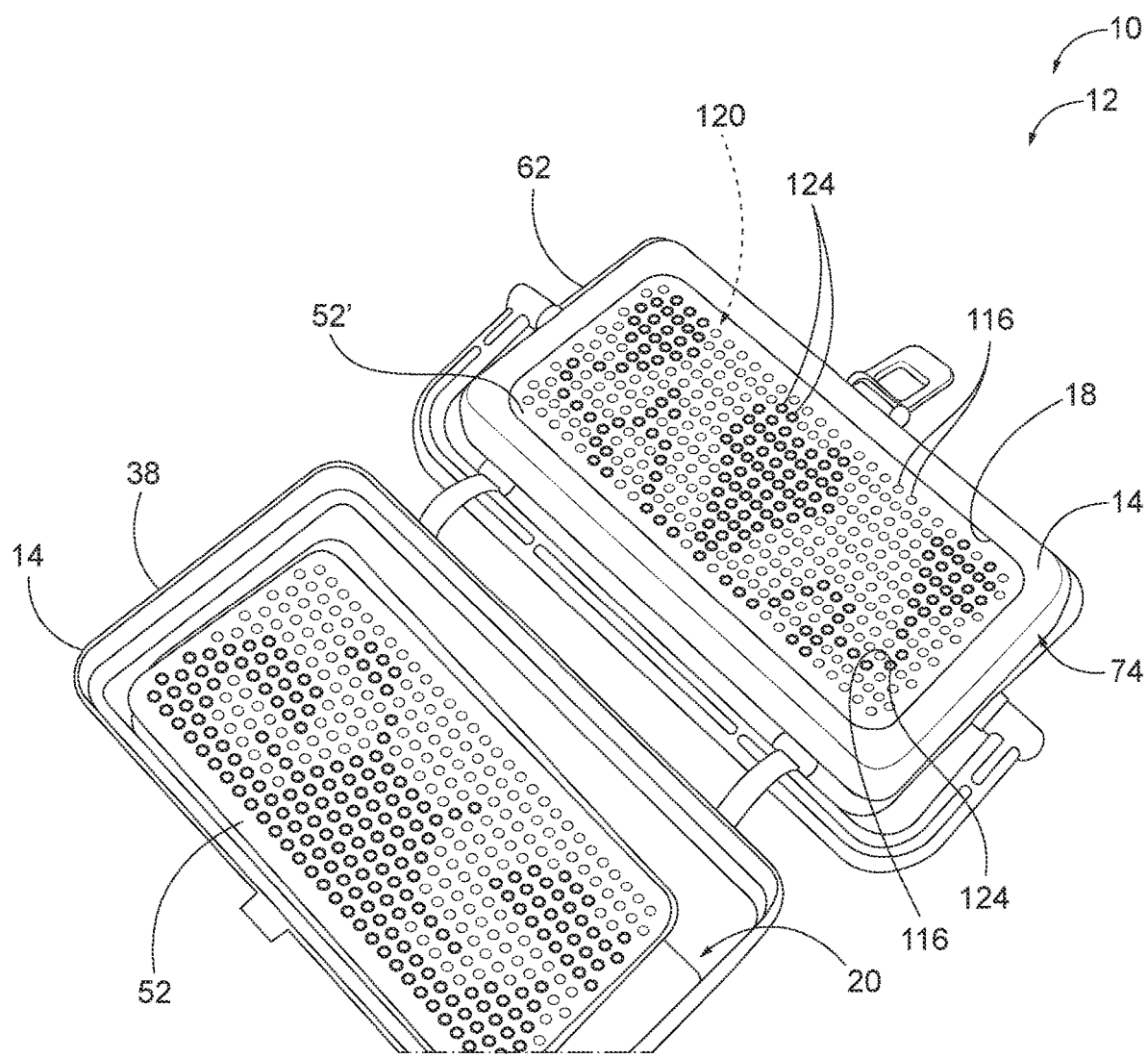
FIG. 13 is a top perspective view of an example of a peg array assembly according to the present disclosure, shown in a hinged open configuration during use, with a design template positioned for peg insertion.

FIG. 3 shows a partially exploded view of a portion of an example of portable peg array assembly 12. A subassembly 74 is shown, having panel 16 (or panel subassembly 120) positioned with respect to a portion of housing 14 (e.g., upper housing 36) such that apertures 22 of panel 16 are viewable and accessible through opening 18 of housing 14. In examples having a multi-part housing 14, opening 18 may be formed through upper housing 36. In other examples, panel 16 may be integrally formed with upper housing 36 and housing 14 may be provided without opening 18. As shown in FIG. 3, in some examples, panel 16 is coupled to housing 14. Light and battery assembly 28 and two design templates 52 also are shown in FIG. 3. When fully assembled, light and battery assembly 28 may be positioned between panel 16 (or panel subassembly 120) and a storage area (e.g., internal volume 20 of housing 14) where design templates 52 may be stored. For simplicity, templates 52 as shown in FIG. 3 do not include indicia or template apertures 116 indicating suggested positioning and colors of light-transmitting pegs 24, though templates 52 generally will include the same. For example, FIGS. 12-13 illustrate an example of a design template 52 with template apertures 116 extending therethrough.

With continued reference to FIG. 3, light and battery assembly 28 may include a light source 30, such as one or more LED light strips or bulbs, and battery 32 to power light source 30. Battery 32 may be any suitable type of battery 32, including rechargeable batteries. A battery assembly cover 82 may cover, encase, or enclose light source 30 and battery 32 to protect these elements, though battery assembly cover 82 generally will be at least partially translucent or transparent to enable passage of light from light source 30 to reach apertures 22 and light-transmitting pegs 24 inserted therethrough. Additionally or alternatively, peg array assembly 12 may be powered via a power adaptor or other power source (e.g., solar power).

Figure 4:
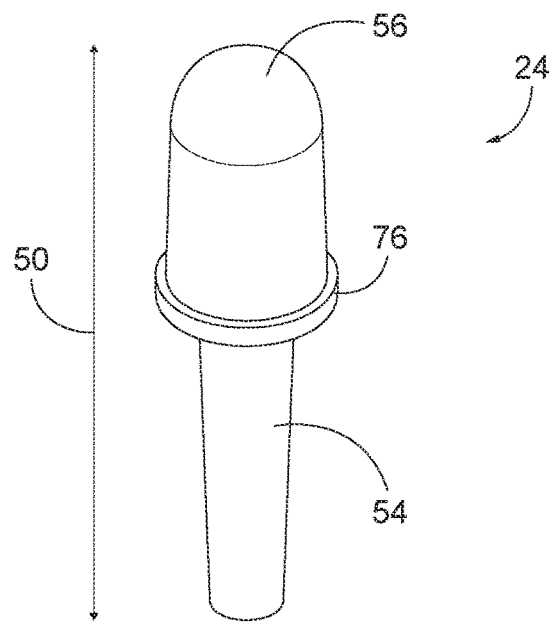
FIG. 4 is a perspective view of an example of a light-transmitting peg for use with disclosed peg array assemblies.

FIG. 4 shows a representative example of a light-transmitting peg 24 that may be used with disclosed systems 10 and portable peg array assemblies 12. Tapered shaft portion 54 is configured to be inserted through a respective slit 42 of elastomeric sheet 40, and through a respective aperture 22 of panel 16. Head portion 56 may be enlarged with respect to tapered shaft portion 54, such that head portion 56 is too large to fit through slit 42 and/or aperture 22, such that when light-transmitting peg 24 is used in portable peg array assembly 12, head portion 56 is configured to be visible, while tapered shaft portion 54 is configured to be positioned on the opposite side of panel 16 from head portion 56. A flange, rim, or lip 76 may project radially outwardly from head portion 56 and may serve as a stop that contacts upper panel surface 48 of panel 16 when light-transmitting peg 24 is fully inserted into aperture 22. Lip 76 may be sized such that the diameter of lip 76 is greater than the diameter of each aperture 22 of panel 16, such that lip 76 is configured to prevent light-transmitting peg 24 from being inserted further into a given aperture in a direction along longitudinal axis 50.

Figure 5:
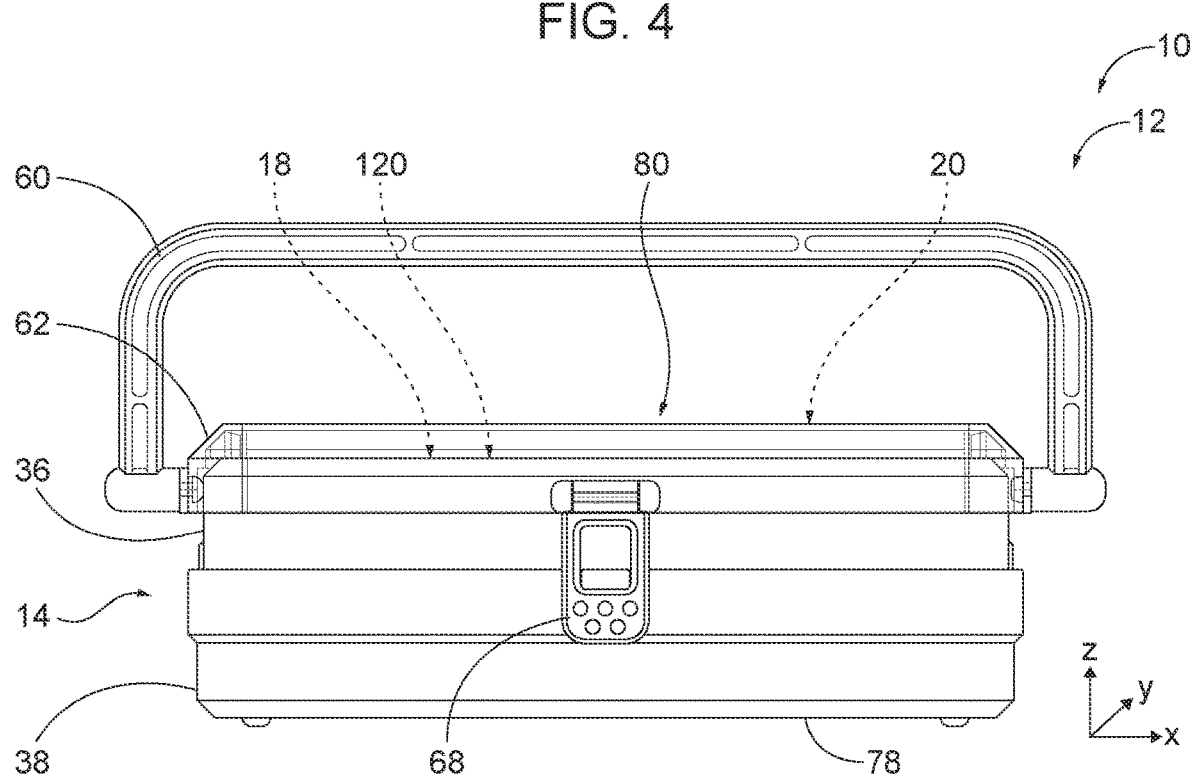
FIG. 5 is an elevation view of an example of a portable peg array assembly according to the present disclosure.
Figure 6:
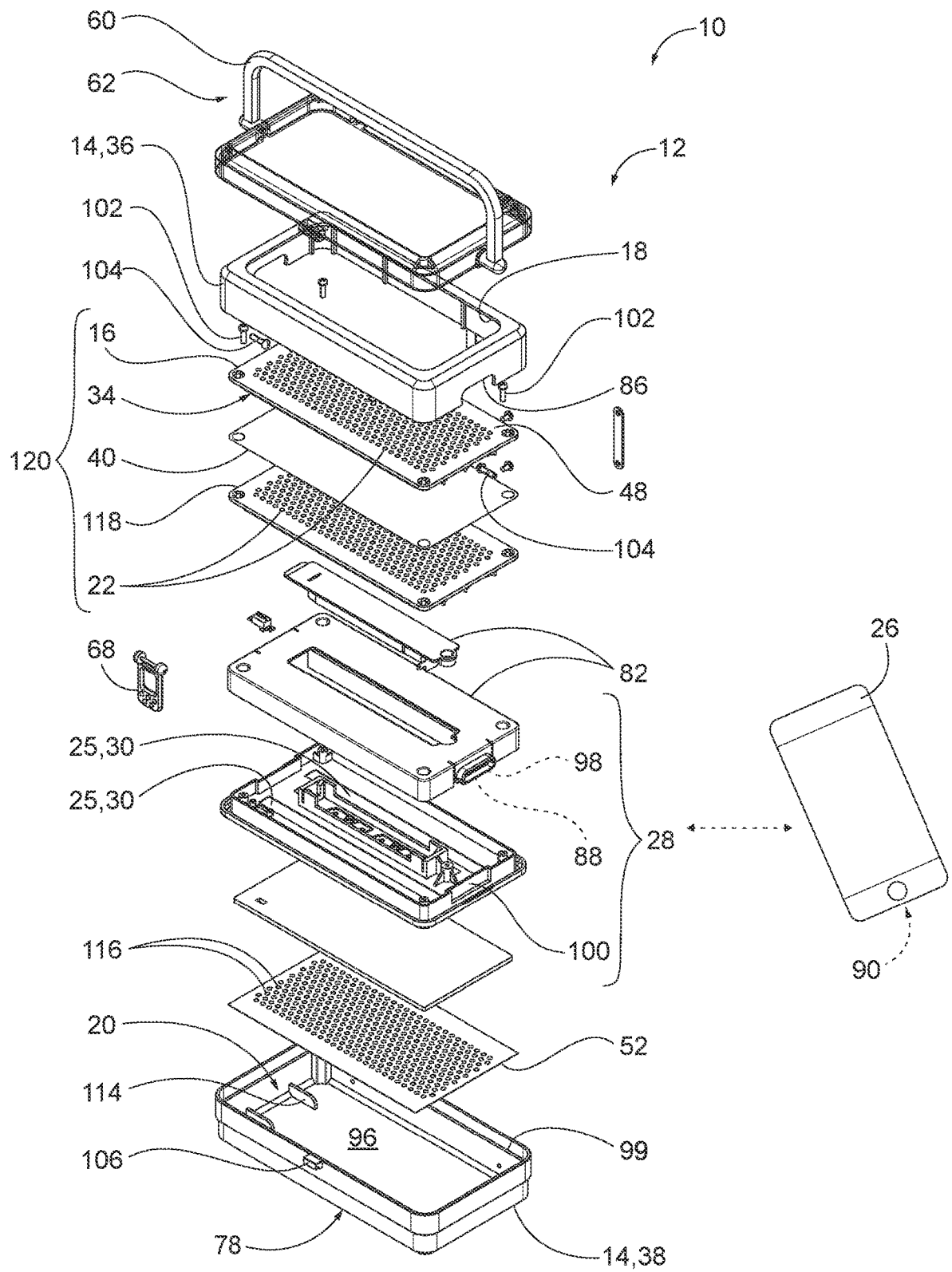
FIG. 6 is an exploded, perspective view of an example of a portable peg array assembly according to the present disclosure.
Figure 7:
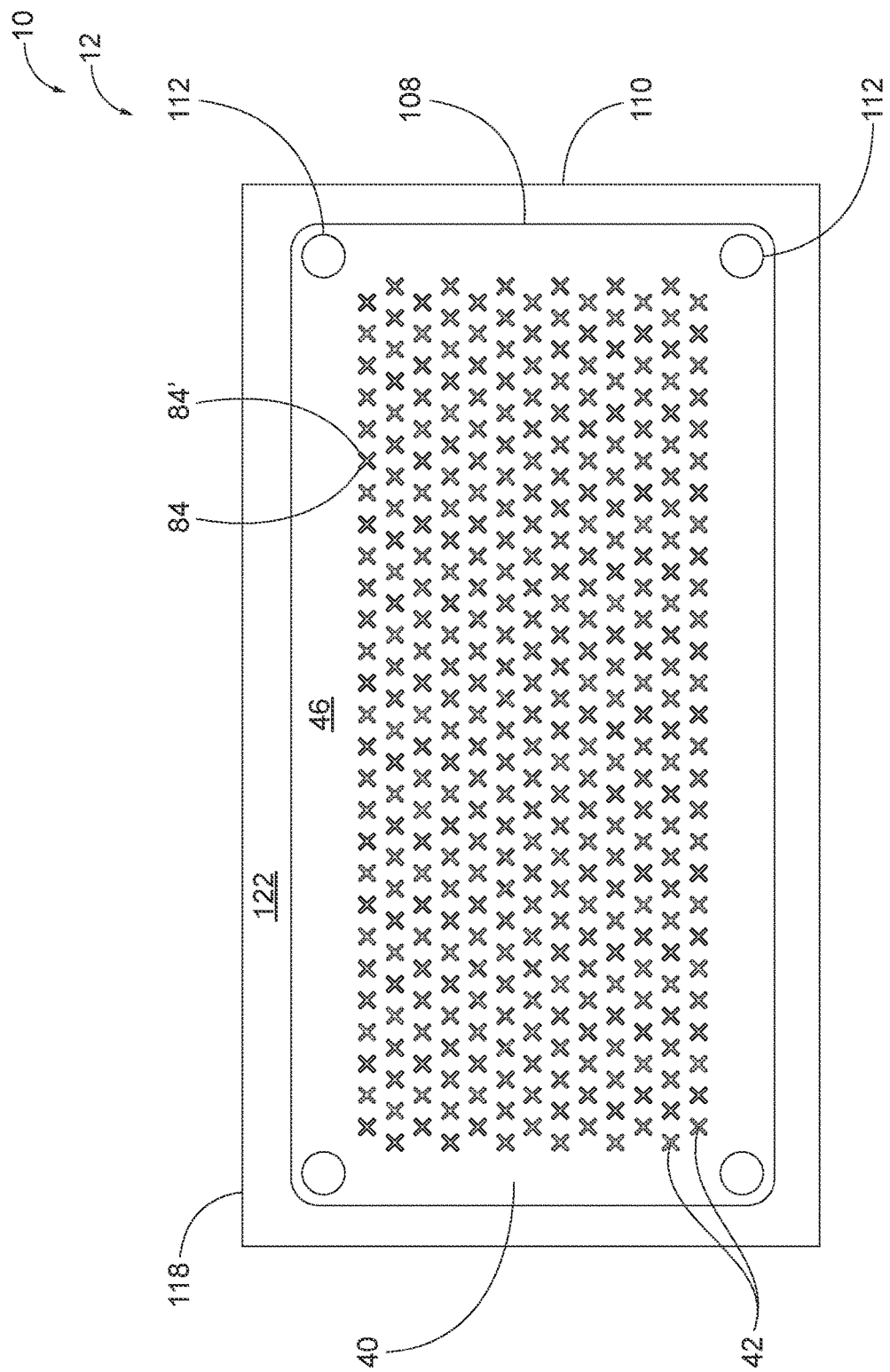
FIG. 7 is a top plan view of an example of an elastomeric sheet for use with disclosed peg array assemblies.

FIGS. 5-7 are shown approximately to scale. FIG. 5 shows a front elevation view of an example of portable peg array assembly 12. In this example, housing 14 includes two selectively separable portions: upper housing 36 (which may be, or include, panel subassembly 120) and lower housing 38. Upper housing 36 is generally positioned above lower housing 38 when portable peg array assembly 12 is in the upright position and close configuration shown in FIG. 5. In FIG. 5, the direction of gravity is depicted as the vertical axis (e.g., the Z-axis). In this configuration, a base, or bottom side 78 of lower housing 38 may be configured to rest on a surface, while opening 18 is formed in upper housing 36 and faces an upper side 80 of portable peg array assembly 12. In some examples, and as shown in FIG. 5, lower housing 38 is configured to engage with upper housing 36 such that upper housing 36 and lower housing 38 together form internal volume 20 contained within housing 14 as a whole.

FIG. 5 illustrates portable peg array assembly 12 in a closed configuration, with lower housing 38, upper housing 36, and cover 62 engaged together to enclose internal volume 20. To transition portable peg array assembly 12 to an open configuration, cover 62 may be removed from upper housing 36, such as by disengaging latch 68, thereby allowing access (e.g., through opening 18) to any light-transmitting pegs 24 currently positioned in panel 16. With cover 62 moved away from opening 18 and/or housing 14, light-transmitting pegs 24 may be rearranged, removed, and/or replaced as desired. To further open portable peg array assembly 12, upper and lower housing 36, 38 may be opened, hinged, or separated from one another to access internal volume 20 and components stored therein (e.g., light and battery assembly 28, mobile device 26, templates 52, panel 16, elastomeric sheet 40, and/or light-transmitting pegs 24). In some examples, upper housing 36 may be selectively separated from, or hinged away from, lower housing 38, even while cover 62 remains coupled to upper housing 36. For example, FIGS. 12-13 illustrate an example of peg array assembly 12 in a hinged open configuration.

FIG. 6 shows an exploded view of an example of a portable peg array assembly 12. In the example of FIG. 6, elastomeric sheet 40 is sandwiched between upper second panel 118 and panel 16. In some examples, elastomeric sheet 40 is configured to block light, and thus may not be transparent. Light and battery assembly 28 is sandwiched between panel subassembly 120 and an internal surface 96 of housing 14, which may be an internal surface 96 of lower housing 38 in this example, though as indicated in FIG. 6, light and battery assembly 28 may be selectively removed from housing 14 and replaced with mobile device 26. In other words, mobile device 26 may be placed into the area of housing 14 from where light and battery assembly 28 was removed, such that mobile device 26 may be positioned between panel subassembly 120 and internal surface 96 of lower housing 38. Additionally or alternatively, peg array assembly 12 may be configured such that mobile device 26 may be placed within cover 62, and underneath panel subassembly 120, when peg array assembly 12 is in an open configuration. In some examples, lower housing 38 includes a lip 99 which may be configured to support mobile device 26 or light and battery assembly 28 at a set distance from panel 16 when peg array assembly 12 is assembled together. Lip 99 additionally or alternatively may be configured for engagement with upper housing 36 and/or panel subassembly 120, such as to space light and battery assembly 28 and/or panel subassembly 120 away from templates 52 stored within internal volume 20 when peg array assembly 12 is in a closed configuration.

In this example, panel 16 is oriented such that upper panel surface 48 faces opening 18, and such that lower panel surface 34 faces internal surface 96 of lower housing 38. Thus, when portable peg array assembly 12 is assembled with light and battery assembly 28 positioned in housing 14, lower panel surface 34 faces light and battery assembly 28. Similarly, when portable peg array assembly 12 is assembled with mobile device 26 replacing light and battery assembly 28 in housing 14, lower panel surface 34 faces mobile device 26. Portable peg array assembly 12 may be used in this arrangement, and/or stored and carried in this arrangement. In some examples, in use, panel subassembly 120 is placed into cover 62, with lower panel surface 34 facing light and battery assembly 28 or mobile device 26 (e.g., light and battery assembly 28 or mobile device 26 may be positioned underneath panel subassembly 120 within cover 62 while a user inserts light-transmitting pegs 24 through apertures 22 and/or lights or animates light-transmitting pegs 24 using mobile device 26 or light and battery assembly 28).

One or more design templates 52 are shown and may be configured to be stored within housing 14 (e.g., within lower housing 38). For example design templates 52 may be stored between light and battery assembly 28 and internal surface 96 of lower housing 38 when light and battery assembly 28 is positioned within housing 14, or design templates 52 may be stored between mobile device 26 and internal surface 96 of lower housing 38 when mobile device 26 is positioned within housing 14. Similarly, a plurality of light-transmitting pegs 24 may be stored within housing 14, such as within lower housing 38. In a specific example, a plurality of light-transmitting pegs 24 may be stored between light and battery assembly 28 and internal surface 96 of housing 14 (or between mobile device 26 and internal surface 96). In some examples, housing 14 includes standoffs 114 extending from internal surface 96, which may be configured to hold templates 52 above light-transmitting pegs 24 contained within housing 14.

Housing 14 may include a cutout, or port 86. In some examples, cutout 86 may be configured to provide access to a charging port 88 of light and battery assembly 28 and/or to one or more ports 90 of mobile device 26 while mobile device 26 is positioned within housing 14 to direct light towards panel 16 and through light-transmitting pegs 24. Additionally or alternatively, cutout 86 may be configured to facilitate separation of upper housing 36 from lower housing 38 by providing space for a user's finger or a tool to push apart upper and lower housing 36, 38. In addition to or instead of a charging port 88, light and battery assembly 28 may include a press tab 98 that is configured to releasably engage with a notch 100, such that battery assembly cover 82 may be snapped off, or disengaged, to access light source 30 and/or battery 32 positioned within light and battery assembly 28. Additionally or alternatively, light and battery assembly 28 may include a plurality of fasteners (e.g., threaded fasteners 102) that are configured to assemble the components of light and battery assembly 28 together until fasteners 102 are removed. Press tab 98 additionally or alternatively may be configured to facilitate selective engagement and removal of light and battery assembly 28 with housing 14. For example, press tab 98 may be spring biased in an outward position. When light and battery assembly 28 is placed within housing 14, press tab 98 may be forced to an inward position. When it is desired to remove light and battery assembly 28 from housing 14, press tab 98 may be disengaged from housing 14. Fasteners 102 additionally or alternatively may be positioned to removably secure elastomeric sheet 40 to panel 16, and/or to secure elastomeric sheet 40 and panel 16 to light and battery assembly 28. Additionally or alternatively, fasteners 102 may be configured to form panel subassembly 120 by coupling panel 16, elastomeric sheet 40, and second panel 118 together. Pins 104 may extend through cover 62 and may be configured to create a rotatable engagement of handle 60 with respect to cover 62.

To assemble portable peg array assembly 12 into a closed configuration, elastomeric sheet 40 and panel 16 (or panel subassembly 120) may be seated within, and/or coupled to, upper housing 36, adjacent opening 18. Light-transmitting pegs 24 and/or design templates 52 may be placed into lower housing 38 for storage. Light and battery assembly 28 or mobile device 26 may be placed above templates 52 and under panel 16 (e.g., under panel subassembly 120), and then lower housing 38 and upper housing 36 may be engaged with one another, such as by pressing them together to enclose elastomeric sheet 40, panel 16, and light and battery assembly 28 or mobile device 26 within internal volume 20 formed between upper and lower housing 36, 38. In this configuration, light-transmitting pegs 24 (that are not currently stored in internal volume 20) may be inserted through slits 42 of elastomeric sheet 40 and apertures 22 of panel 16 by passing the light-transmitting pegs 24 through opening 18. To selectively close off access to opening 18, cover 62 may be placed onto upper housing 36, with cover 62 being configured to extend across opening 18. Latch 68 may be coupled to cover 62 and may be configured to engage with a feature 106 of lower housing 38 such as an extension, protrusion, lip, tab, or hook, to selectively and releasably secure cover 62, upper housing 36, and lower housing 38 together.

Thus, in an assembled, closed configuration, light and battery assembly 28 (or mobile device 26) may be positioned above templates 52 and/or light-transmitting pegs 24 stored within lower housing 38, panel 16 (or panel subassembly 120) is positioned above light and battery assembly 28 or mobile device 26, and opening 18 and/or cover 62 are positioned above panel 16 or panel subassembly 120. As described herein, the various elements of portable peg array assemblies 12 may be described in terms of relative positions to each other when in the upright position shown in FIG. 5. Accordingly, when describing a first element as being above or below a second element, the first element falls in a horizontal plane that is above or below a horizontal plane in which the second element falls, but the first element is not necessarily directly above or below the second element along a vertical vector.

FIG. 7 shows a top plan view of an example of elastomeric sheet 40 placed onto upper panel surface 122 of second panel 118 (panel 16 is not shown, for clarity). From this view, apertures 22 of second panel 118 are obscured by elastomeric sheet 40. While slits 42 are prominently drawn in FIG. 7 for clarity, in disclosed examples, slits 42 may be very thin, and/or edges of the elastomeric sheet 40 in the area of slits 42 may contact itself such that slits 42 are essentially or entirely closed unless a light-transmitting peg 24 is inserted therethrough and forces the material away from each other in the area of the respective slit 42. When light-transmitting peg 24 is inserted through a respective slit, shaft portion 54 of the peg may force open the respective slit 42 just enough to allow for passage of shaft portion 54 through the slit 42. Elastomeric sheet 40 may be formed of a relatively thin, compliant material that at least somewhat conforms to the circumference of shaft portion 54 of light-transmitting peg 24 when the peg is inserted through a given slit 42. While the example of FIG. 7 illustrates X-shaped slits 42, slits 42 may be provided in any desired shape or orientation or arrangement, though generally slits 42 are minimal in size and gapping. This arrangement may help block light from passing through elastomeric sheet 40 except in areas where a light-transmitting peg 24 is inserted through a slit 42, when elastomeric sheet 40 is provided in a version configured to substantially block light from passing therethrough.

Elastomeric sheet 40 is illustrated as having a particular number of rows of slits 42, though this arrangement is not limiting, and elastomeric sheets 40 may be provided with any desired number of slits 42 in any desired arrangement and may include more or fewer rows and/or more or fewer total overall slits 42 than is illustrated in the example of FIG. 7. Additionally, a perimeter 108 of elastomeric sheet 40 is illustrated as being smaller than a perimeter 110 of second panel 118 in this example, though in other examples, perimeter 108 of elastomeric sheet 40 may be closer to the same size as perimeter 110 of second panel 118, the same size and shape of perimeter 110 of second panel 118, and/or larger than perimeter 110 of second panel 118. In various examples of portable peg array assembly 12, slits 42 may be positioned closer to perimeter 108 of elastomeric sheet 40 in one or more dimensions than in the illustrated example. Furthermore, while adjacent rows of slits 42 are illustrated as being staggered with respect to one another in FIG. 7, in other examples, slits 42 may be arranged in rows and columns that are lined up with one another, and/or slits 42 may be provided in a different arrangement.

In some examples, elastomeric sheet 40 is placed onto upper panel surface 48 and held in place by being sandwiched between panel 16 and upper housing 36. In some examples, elastomeric sheet 40 is placed onto second upper panel surface 122 of second panel 118 and sandwiched between panel 16 and second panel 118 to form panel subassembly 120. Additionally or alternatively, elastomeric sheet 40 may be selectively and removably coupled to panel 16 and/or second panel 118, such as via fasteners inserted through holes 112 formed in elastomeric sheet 40, panel 16, and/or second panel 118.

FIGS. 12-13 illustrate an example of peg array assembly 12 in a hinged open configuration during use. In FIG. 12, cover 62 is shown hinged open from housing 14 (e.g., lower housing 38), with design templates 52 shown stored in internal volume 20 of housing 14. Mobile device 26 is shown placed in cover 62. As shown in FIG. 12, mobile device 26 need not be any particular size with respect to housing 14 or cover 62, and screen 58 may be smaller than the footprint of the array of apertures 22 of panel 16. FIG. 13 shows the arrangement of FIG. 12, but with upper housing 36 (e.g., subassembly 74 and panel subassembly 120) being positioned on mobile device 26 within cover 62. As shown, subassembly 74 may not fit entirely within cover 62, though subassembly 74 may be sized to nest partially within cover 62. FIG. 13 shows a selected design template 52' in place on panel 16. Opening 18 of upper housing 36 may serve to create a recess configured to receive the selected design template 52'. In other words, design templates 52 may be sized and shaped to fit within opening 18 and rest on upper panel surface 48 of panel 16.

Template apertures 116 are pre-formed in design templates 52, and design templates 52 thus may be configured to be re-used, as it does not damage the templates to insert light-transmitting pegs 24 through template apertures 116. Design templates 52 may be formed of any suitable material, but generally are relatively thin. Suitable examples of materials may include, but are not limited to, laminated paper or thin plastic materials. Template apertures 116 generally are configured to be arranged on design templates 52 in the same array arrangement as apertures 22 in panel 16 and second panel 118. The design or pattern of a given design template 52 may be indicated via a plurality of colored rings 124 printed on template 52. Each respective colored ring 124 encircles a respective template aperture 116 to indicate and the position and recommended color of light-transmitting peg 24 to be inserted through the respective template aperture 116 for a particular design. For example, a red circle, or ring 124, may be printed surrounding a respective template aperture 116 to indicate that a red light-transmitting peg 24 should be inserted through that respective template aperture 116. While colored rings 124 are shown in bolded black in FIG. 13, it is to be understood that different rings 124 may be different colors to represent a template for a multi-colored design. In this hinged open configuration, light-transmitting pegs 24 may be inserted through the selected design template 52', through apertures 22 of underlying panel 16, through slits 42 of underlying elastomeric sheet 40, and through apertures 22 of underlying second panel 118. Mobile device 26 may be illuminated while subassembly 74 is positioned above mobile device 26, as shown, to illuminate the light-transmitting pegs 24. Upper housing 36 may be configured to hold or position panel subassembly 120 that is spaced above mobile device 26, such that the entire pattern of light-transmitting pegs 24 may be illuminated even if mobile device 26 is smaller than enlarged opening 18, design template 52, and/or the array of apertures 22 of panel 16.

Figure 14:
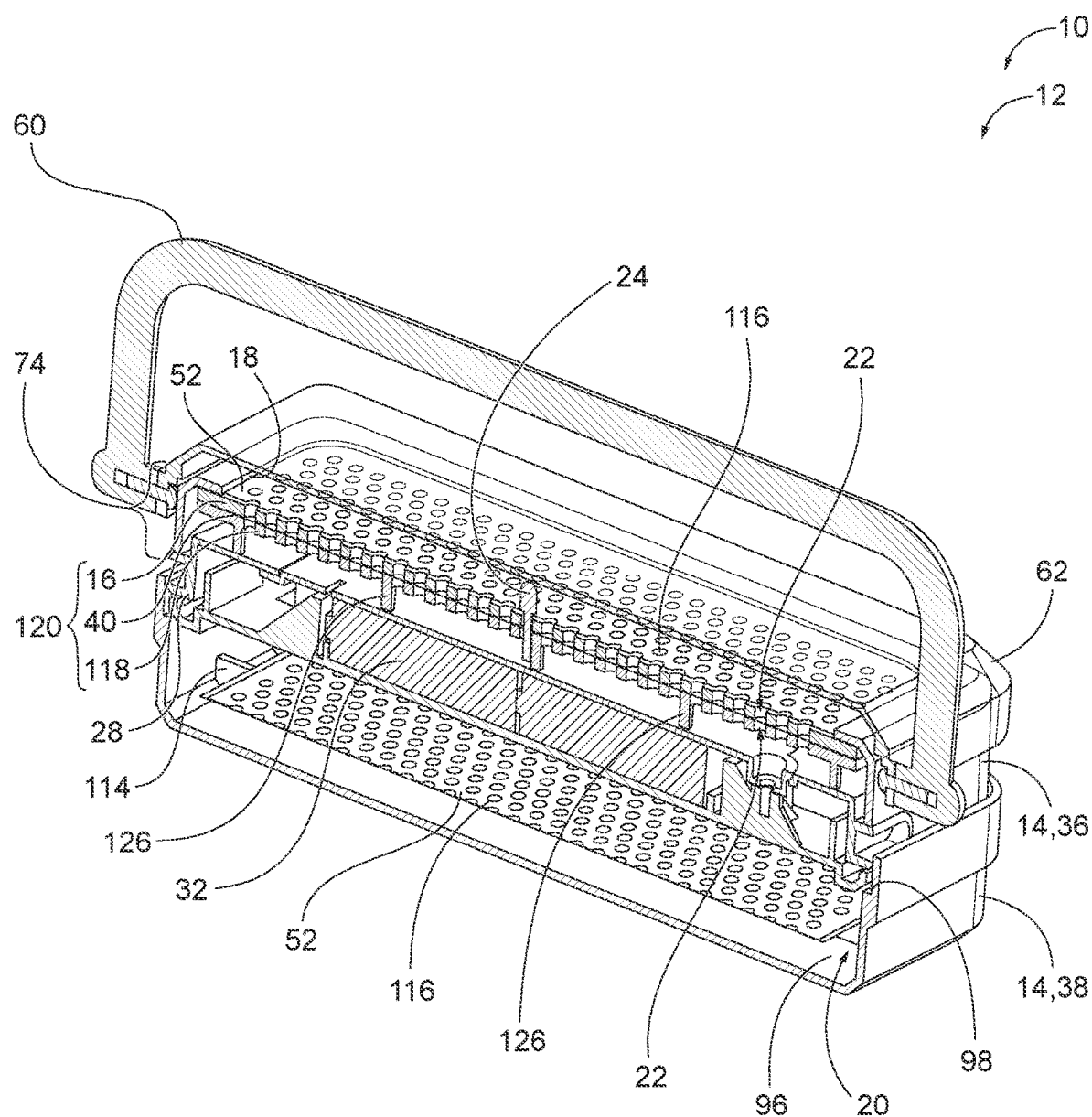
FIG. 14 is a partial cutaway view of an example of a peg array assembly according to the present disclosure.

FIG. 14 illustrates a partial cut away view of an example of peg array assembly 12, shown in a closed configuration. As seen in FIG. 14, cover 62 may be offset from panel 16 a sufficient amount such that any light-transmitting pegs 24 inserted through apertures 22 and slits 42 of panel subassembly 120 may remain inserted even when cover 62 is in place. Light and battery assembly 28 is shown in place beneath panel subassembly 120, and may rest on lip 98 of lower housing 38, such that light and battery assembly 28 is held above design templates 52 and any light-transmitting pegs stored in internal volume 20. Design templates 52 are held above internal surface 96 of lower housing 38 via standoffs 114 such that light-transmitting pegs may be stored under design templates 52. Furthermore, in some examples, second panel 118 may include panel standoffs 126, which may be configured to create space between panel subassembly 120 and mobile device 26 when subassembly 74 is placed onto mobile device 26 such as shown in FIG. 13. FIG. 14 shows a design template 52 in place on upper panel surface 48 of panel 16, seated within opening 18 of housing 14.

FIGS. 8-11 schematically provide flowcharts that represent illustrative, non-exclusive examples of methods according to the present disclosure. In FIGS. 8-11, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 8-11 are not limiting and other methods and steps are within the scope of the present disclosure, including methods having greater than or fewer than the number of steps illustrated, as understood from the discussions herein.

Figure 8:
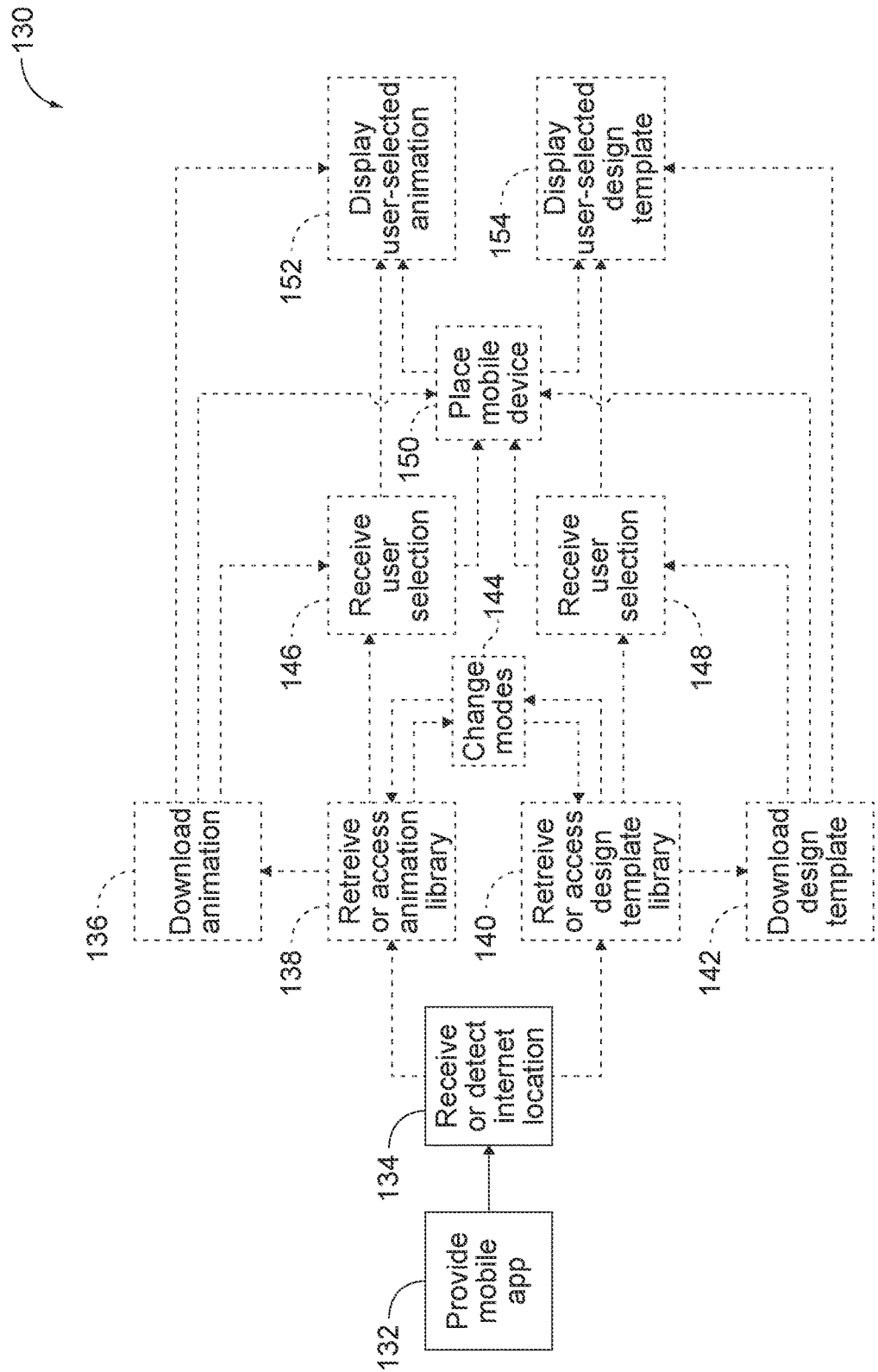
FIG. 8 is a schematic flowchart diagram representing methods according to the present disclosure.

FIG. 8 illustrates methods 130 including providing a mobile app (e.g., mobile app 66), at 132, for use on a mobile device (e.g., mobile device 26) configured for use in presently disclosed peg array assemblies 12. Methods 130 also include receiving or detecting an internet location at 134, via the mobile app. For example, the receiving or detecting the internet location at 134 may include scanning a QR code or other type of code, entering a website url, or otherwise receiving input from a user. Once the internet location is detected by the mobile app, methods 130 also may include retrieving or accessing an animation and/or audio library from a remote location via the mobile app, at 138, and/or retrieving or accessing a design template library from a remote location via the mobile app at 140. When accessing the animation library at 138, methods 130 may further include receiving a user selection designating a user-selected animation and/or sound or music selection from among a plurality of animations of the animation library at 146, via the mobile app. Methods 130 may further include displaying the user-selected animation on a screen (e.g., screen 58) of the mobile device at 152, via the mobile app and/or playing the selected sound or music via a speaker of the mobile device. Similarly, when accessing a design template library at 140, methods 130 may further include receiving a user selection designating a user-selected template from among a plurality of design templates of the design template library at 148, via the mobile app. Methods 130 may further include displaying the user-selected design template on the screen of the mobile device via the mobile app, at 154. Displaying the user-selected design template at 154 generally includes displaying a suggested placement of a plurality of light-transmitting pegs, via the mobile app. Receiving the user selection from the animation library at 146 and/or receiving the user selection from the design template library at 148 may include receiving a plurality of user-selected settings via the mobile app.

In some examples, the mode of the mobile app may be changed at 144 to switch between an animation mode in which the animation library is accessed at 138 and the user-selected animation is displayed at 152, and a template mode in which the design template library is accessed at 140 and the user-selected template is displayed at 154. In other examples, the mobile app may allow for user selection and displaying of animation and/or design templates without changing modes. Methods 130 may further comprise downloading one or more design templates for offline use, via the mobile app, at 142 and/or downloading one or more animations for offline use, via the mobile app, at 136. Additionally or alternatively, animations may be streamed via the mobile app. In some examples, the mobile device is placed into the housing (e.g., housing 14) of the peg array assembly, at 150. Placing the mobile device in the housing at 150 generally will be performed after receiving a user selection at 146 and/or 148, though in some examples the user selections may be received once the mobile device has already been placed in the housing at 150. Similarly, displaying the user-selected animation at 152 and/or displaying the user-selected design template at 154 generally will be performed via the mobile app after the mobile device has been placed in the housing at 150, but need not necessarily be performed in this order.

Figure 9:
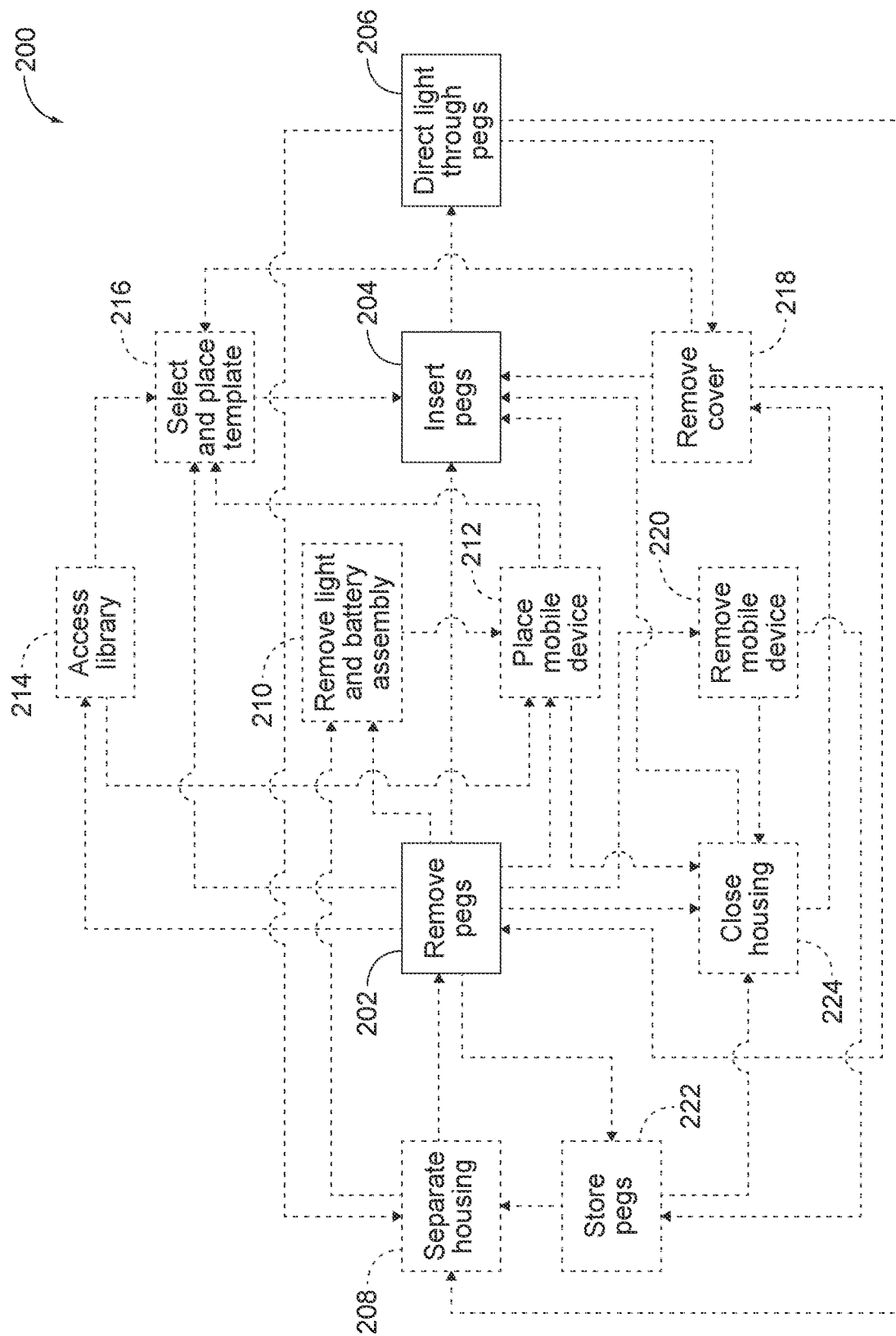
FIG. 9 is a schematic flowchart diagram representing methods according to the present disclosure.

FIG. 9 illustrates methods 200 of interacting with disclosed peg array assemblies. Methods 200 generally include removing one or more light transmitting pegs at 202, such as from storage within a housing of a peg array assembly and/or from apertures of one or more panels of the peg array assembly, inserting one or more light-transmitting pegs at 204, such as through slits of an elastomeric panel and through apertures of the panel(s), and directing light through the light-transmitting pegs at 206. The directing light at 206 generally includes directing light towards a lower panel surface of the panel such that the light is transmitted through the plurality of respective light-transmitting pegs and visible at the upper side of the housing (e.g., through the opening of the housing). The directing light at 206 may be accomplished via a light source (e.g., light source 30 of light and battery assembly 28) or via light emitting from a mobile device (e.g., mobile device 26).

In examples where the housing of the peg array assembly is a multi-part housing, methods 200 may include separating components of the housing at 208, such as separating an upper housing (e.g., upper housing 36) from a lower housing (e.g., lower housing 38) to access an internal volume defined within the housing. For example, the separating the housing at 208 may include disengaging a latch, actuating a mechanical release, and/or pressing a component out of a detent. The separating the housing at 208 may include entirely separating the upper housing from the lower housing, or simply opening the upper housing and the lower housing away from each other, such as hinging the two portions apart, rather than fulling separating them from each other. Methods 200 also may include closing the housing at 224, such as coupling the upper housing to the lower housing. In some examples, the closing the housing at 224 may be performed when use of the peg array assembly is complete, and thus may include re-placing the light and battery assembly within the housing, in examples where the light and battery assembly was previously removed at 210. The closing the housing at 224 is performed before the inserting the plurality of light-transmitting pegs at 204, in some examples. In some methods, a cover (e.g., cover 62) of the peg array assembly is removed at 218. Removing the cover at 218 may be performed before the inserting the light-transmitting pegs at 204, as removing the cover may allow access to the apertures of the panel (e.g., through the opening of the housing of the peg array assembly).

Methods 200 may include selecting a design template at 216, which may be selected from among a plurality of design templates (e.g., design templates 52) stored in the internal volume of the peg array assembly housing. The selecting the design template at 216 may include placing the selected design template adjacent an upper sheet surface of the elastomeric sheet (e.g., on the upper sheet surface) such that the elastomeric sheet is positioned between the selected design template and the panel. In other examples, the selecting the design template at 216 may include placing the selected design template adjacent (e.g., on) an upper panel surface of the panel. In specific examples, the selecting the design template at 216 may include placing the selected design template on the upper surface of the panel such that the design template rests within the opening of the housing or subassembly. In some examples, the placing the selected design template at 216 is performed prior to the inserting the plurality of light-transmitting pegs at 204. The inserting the plurality of light-transmitting pegs at 204 may include inserting the plurality of light-transmitting pegs through the design template selected and placed at 216 (e.g., through the template apertures of the selected design template).

In some examples of methods 200, a light and battery assembly is removed from the peg array assembly at 210, and a mobile device is placed at 212. For example, the mobile device may be placed into the internal volume of the housing, or into the cover of the peg array assembly at 212. Thus, the directing light at 206 may be performed via emitting light from the light and battery assembly when the light and battery assembly is positioned under the panel or panel subassembly, or the directing light at 206 may be performed via emitting light from the mobile device when the mobile device is positioned under the panel or panel subassembly. In some examples, the directing light at 206 includes creating an animation using the mobile device and the plurality of light-transmitting pegs, which may include playing music or sounds along with the animation. The mobile device may be removed from the internal volume of the peg array assembly (or from the cover) at 220, once it is no longer desired to use the mobile device within the peg array assembly. The light-transmitting pegs may be removed, at 202, from the apertures of the panel when it is desired to store them in the internal volume of the peg array assembly at 222, and/or when it is desired to change one or more of the light-transmitting pegs inserted through the apertures of the panel to change the appearance of the design or pattern or image created by the light-transmitting pegs. In some examples, the plurality of light-transmitting pegs are stored at 222 such that the light and battery assembly serves to separate the plurality of light-transmitting pegs from the panel when the peg array assembly is fully assembled and in a closed configuration. Specifically, the storing the plurality of light-transmitting pegs at 222 may include placing the plurality of light-transmitting pegs below the lower surface of the panel of the peg array assembly (or below the panel subassembly), such that the panel (or panel subassembly) is configured to prevent the plurality of light-transmitting pegs from falling through the opening of the housing, or otherwise out of the housing, when the plurality of light-transmitting pegs are stored at 222 and the peg array assembly is in the closed configuration.

Methods 200 may include accessing a template library and/or an animation library via the mobile device, at 214. For example, the accessing the template library and/or the animation library at 214 may be performed using a QR code or other code configured to be scanned by the mobile device. Additionally or alternatively, the accessing the template library and/or the animation library at 214 may be performed via a mobile app on the mobile device. The accessing the template library and/or animation library at 214 also may include choosing an animation from among a plurality of different animations, using the mobile device, and/or choosing settings from among a plurality of different settings, using the mobile device, wherein the plurality of different settings are configured to define the brightness and/or color of light emitted from the mobile device at various points in time.

Figure 10:
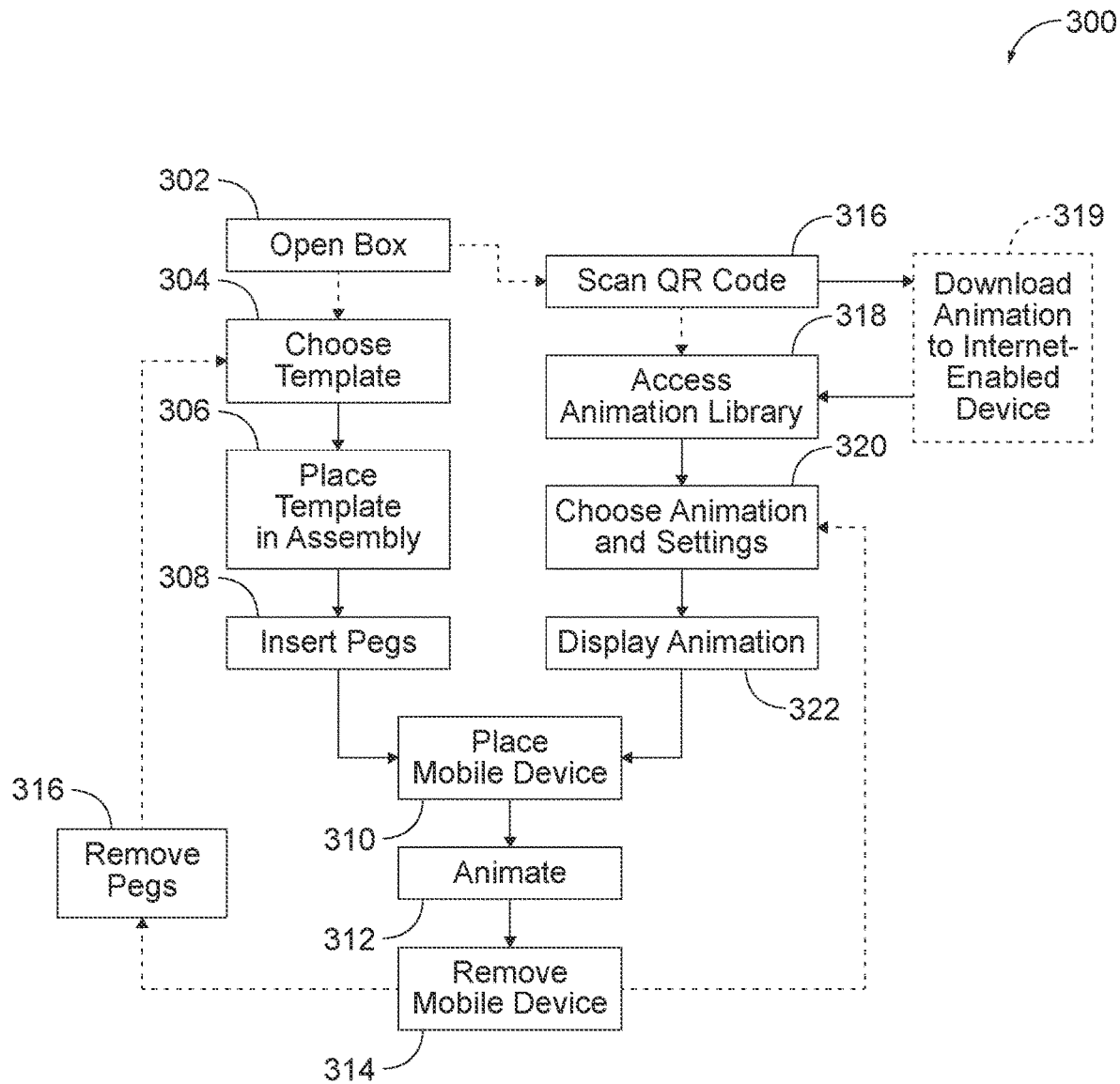
FIG. 10 is a schematic flowchart diagram representing methods according to the present disclosure.

FIG. 10 illustrates an example of methods 300 of using disclosed peg array assemblies. In method 300, the box, or housing, of the peg array assembly is opened, at 302, such as by removing a cover from the housing, opening a latch closing the housing, and/or separating an upper housing from a lower housing of the peg array assembly. A design template is chosen at 304, such as from among a plurality of design templates stored within the housing, or from among a plurality of design templates stored elsewhere. The chosen template is placed into the peg array assembly at 306, such as by placing the template in the housing, on an upper panel surface of the panel with an array of apertures, and/or on an upper surface of an elastomeric sheet. Light transmitting pegs are inserted at 308, through apertures in the panel, through slits in the elastomeric sheet, and/or through the template itself. The template may include holes or perforations to aid in receiving light-transmitting pegs therethrough (e.g., template apertures 116), or the light-transmitting pegs may be used to pierce or poke through the template (e.g., in examples including templates made of paper). A mobile device, such as a mobile phone, is placed in the housing at 310, and used to animate the light transmitting pegs, at 312. When the user is finished with a particular design template and/or a particular animation, the mobile device is removed from the housing, at 314, and the light-transmitting pegs are removed from the panel, elastomeric sheet, and template, at 316.

Additionally or alternatively to the choosing a template at 304, a QR code may be scanned at 316 to access an animation library at 318 and/or download (or stream) one or more animations to an internet-enabled device (e.g., the mobile phone) at 319. Then, an animation and associated settings is chosen at 320, and the animation is displayed on the mobile device at 322. Then, the mobile device may be placed in the housing or cover of the portable peg array assembly at 310 to animate the light-transmitting pegs at 312. Again, when finished, the mobile device is easily removed from the housing or cover at 314. If it is desired to change the animation and/or settings at 320 without changing or removing the light-transmitting pegs, these changes can be made via the mobile device and then the newly selected animation can be displayed at 322 to again animate the light-transmitting pegs at 312. While methods 300 indicate removing the mobile device to change the settings at 320, and/or access the animation library at 318, in some examples these steps may be performed on the mobile device without removing it from the housing of the peg array assembly. In other words, disclosed peg array assemblies may be configured to enable access to the mobile device without fully removing it from the housing or cover, such as by simply removing the panel, panel subassembly, and/or upper housing to access the mobile device.

Figure 11:
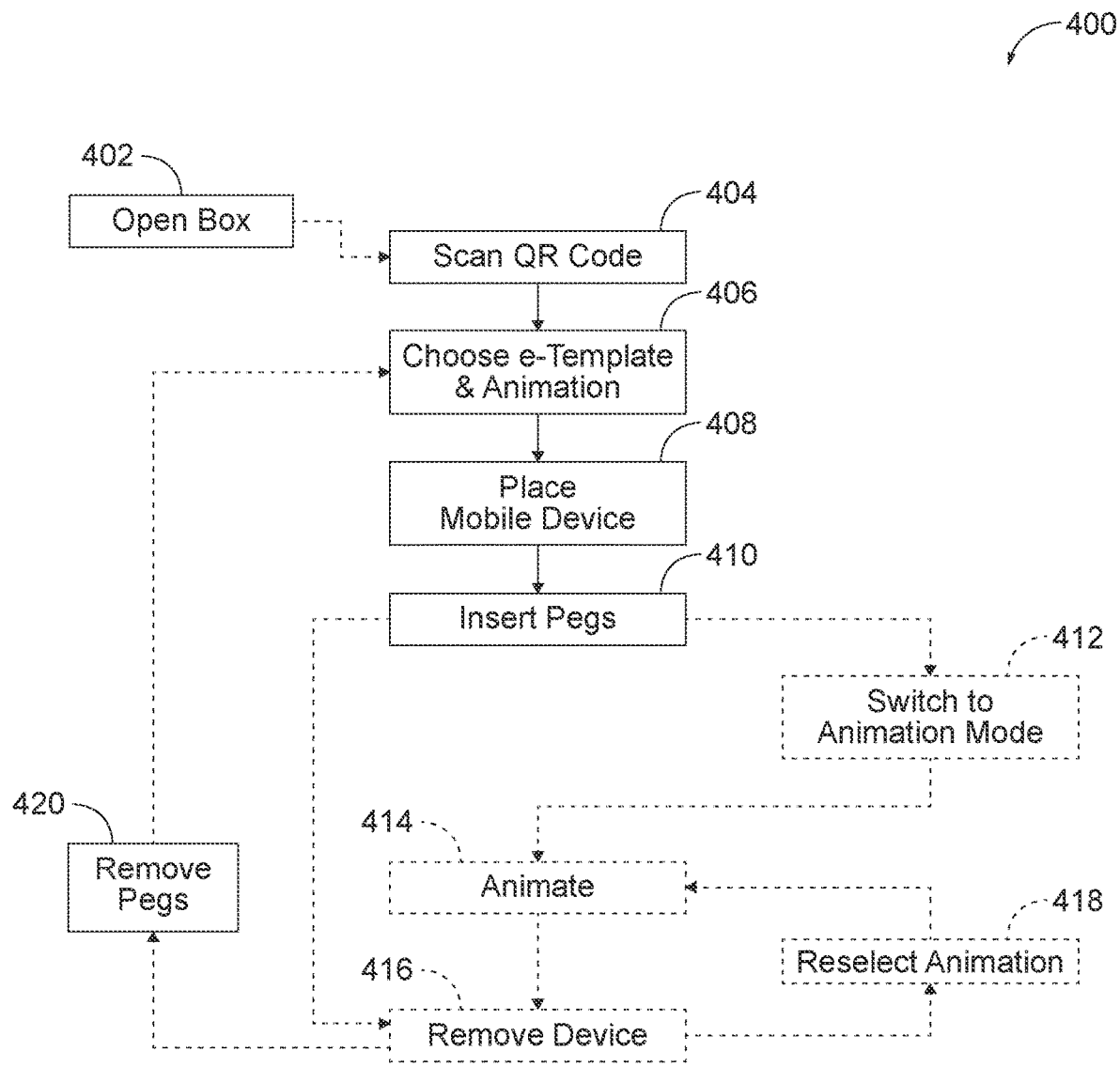
FIG. 11 is a schematic flowchart diagram representing methods according to the present disclosure.

FIG. 11 illustrates an example of methods 400 of using disclosed peg array assemblies. Method 400 includes opening a housing, or box, at 402, such as by removing a cover, opening a latch, and/or separating an upper housing from a lower housing. A QR code is scanned by a mobile device at 404, which provides access to animation and/or template libraries from which an electronic template ("e-template") and/or animation is chosen at 406. The mobile device is placed in the peg array assembly at 408, and light-transmitting pegs are inserted at 410. The mobile device may display the e-template to indicate suggested positions and colors for light-transmitting pegs to be inserted through the panel. In some examples, the mobile device is in a template mode while displaying the e-template. In some examples, the mobile device is switched to an animation mode at 412 to animate the light-transmitting pegs at 414. If desired, a different animation may be selected at 418 to again animate the light-transmitting pegs at 414, and/or the mobile device may be removed from the housing or cover of the peg array assembly at 416. When the user is finished using the peg array assembly, the light-transmitting pegs may be removed from the panel at 420.

Illustrative, non-exclusive examples of inventive subject matter according to the present disclosure are described in the following enumerated paragraphs:

A1. A peg array assembly, comprising:
a housing, wherein the housing defines an internal volume; and
a panel comprising a plurality of apertures formed therethrough, wherein the plurality of apertures are arranged in an array, wherein each aperture of the plurality of apertures is configured to receive a respective light-transmitting peg and retain the respective light-transmitting peg until the respective light-transmitting peg is selectively removed from the respective aperture, wherein the panel is positioned with respect to the housing such that the array of the plurality of apertures are configured to be accessible, and wherein the peg array assembly is configured to selectively receive a mobile device configured to emit light towards the array of the plurality of apertures.

A1.1. The peg array assembly of paragraph A1, further comprising a light and battery assembly configured to be positioned within the internal volume, wherein the light and battery assembly is configured to be selectively removed from the internal volume without damaging the peg array assembly, wherein the light and battery assembly is configured to house a light source configured to emit light towards the array of the plurality of apertures, and wherein the light and battery assembly is further configured to house a battery configured to power the light source.

A1.2. The peg array assembly of paragraph A1.1, wherein the housing is configured to selectively receive the mobile device when the light and battery assembly is removed from the housing.

A1.3. The peg array assembly of any of paragraphs A1.1-A1.2, wherein the light source is configured to emit light towards a lower panel surface of the panel.

A1.4. The peg array assembly of any of paragraphs A1-A1.3, wherein the panel is coupled to the housing.

A1.5. The peg array assembly of any of paragraphs A1-A1.4, wherein the housing comprises an upper housing and a lower housing.

A1.6. The peg array assembly of any of paragraphs A1-A1.5, wherein the housing comprises an opening, and wherein the array of the plurality of apertures is configured to be accessible through the opening in the housing.

A1.7. The peg array assembly of paragraph A1.6, wherein the opening is formed through an/the upper housing, wherein the opening extends continuously across at least 50% of a length of the upper housing, and wherein the opening extends continuously across at least 50% of a width of the upper housing.

A1.8. The peg array assembly of any of paragraphs A1.5-A1.7, wherein the lower housing is configured to engage with the upper housing such that the upper housing and the lower housing together define the internal volume contained within the upper housing and the lower housing.

A1.9. The peg array assembly of any of paragraphs A1-A1.8, wherein the peg array assembly is a portable peg array assembly.

A2. The peg array assembly of any of paragraphs A1-A1.9, further comprising an elastomeric sheet comprising a plurality of slits formed therethrough.

A2.1. The peg array assembly of paragraph A2, wherein the elastomeric sheet is free from indicia on a portion of an upper sheet surface of the elastomeric sheet that is visible through an/the opening of the housing.

A2.2. The peg array assembly of paragraph A2 or A2.1, further comprising a second panel comprising a second plurality of apertures.

A3. The peg array assembly of any of paragraphs A2-A2.2, wherein the elastomeric sheet is configured to be positioned on an upper panel surface of the panel.

A3.1. The peg array assembly of any of paragraphs A2-A3, wherein the elastomeric sheet is configured to be positioned on a second upper panel surface of a/the second panel.

A3.2. The peg array assembly of any of paragraphs A2-A3.1, wherein the elastomeric sheet is configured to be sandwiched between the panel and a/the second panel, thereby forming a panel subassembly.

A4 The peg array assembly of any of paragraphs A2-A3.2, wherein each respective slit of the plurality of slits is configured to receive a respective light-transmitting peg therethrough.

A5. The peg array assembly of any of paragraphs A2-A4, wherein each respective slit of the plurality of slits is sufficiently aligned with a respective aperture of the plurality of apertures in the panel, such that the peg array assembly is configured to receive a plurality of light-transmitting pegs.

A5.1. The peg array assembly of paragraph A5, wherein each light-transmitting peg is configured to be inserted substantially vertically through a respective slit of the plurality of slits of the elastomeric sheet and through a respective aperture of the plurality of apertures of the panel.

A5.2. The peg array assembly of paragraph A5 or A5.1, wherein each light-transmitting peg is configured to be inserted substantially perpendicularly with respect to an/the upper sheet surface of the elastomeric sheet, through a respective slit of the plurality of slits of the elastomeric sheet, and through a respective aperture of the plurality of apertures of the panel.

A5.3. The peg array assembly of any of paragraphs A2-A5.2, wherein each respective slit of the plurality of slits is sufficiently aligned with a respective aperture of a/the second plurality of apertures in a/the second panel, such that a/the panel subassembly is configured to receive a plurality of light-transmitting pegs.

A6. The peg array assembly of any of paragraphs A2-A5.3, wherein the elastomeric sheet is configured to at least substantially prevent light from passing through the elastomeric sheet except through one or more light-transmitting pegs inserted through one or more respective slits of the elastomeric sheet.

A6.1. The peg array assembly of any of paragraphs A2-A6, wherein at least a portion of the elastomeric sheet is at least substantially transparent.

A7. The peg array assembly of any of paragraphs A1-A6.1, wherein the panel comprises a/the lower panel surface opposite an/the upper panel surface of the panel, wherein the upper panel surface faces an/the opening of the housing.

A7.1. The peg array assembly of paragraph A7, wherein the lower panel surface faces an internal surface of the housing.

A7.2. The peg array assembly of paragraph A7, wherein the lower panel surface faces an internal surface of a/the lower housing.

A8. The peg array assembly of any of paragraphs A7-A7.2, wherein the lower panel surface faces a/the light and battery assembly.

A8.1. The peg array assembly of paragraph A8, wherein the lower panel surface faces the mobile device when the mobile device is received by the housing.

A9. The peg array assembly of any of paragraphs A2-A8.1, wherein each slit of the plurality of slits is X-shaped.

A10. The peg array assembly of any of paragraphs A2-A9, wherein each slit of the plurality of slits comprises two intersecting slit segments.

A11. The peg array assembly of any of paragraphs A2-A10, wherein each slit of the plurality of slits is spaced apart from each other slit of the plurality of slits, such that no one respective slit of the plurality of slits touches another respective slit of the plurality of slits.

A12. The peg array assembly of any of paragraphs A1-A11, wherein a/the light source comprises at least one LED light strip.

A13. The peg array assembly of any of paragraphs A1-A12, further comprising at least one template conveying a suggested design for placement of a/the plurality of light-transmitting pegs.

A14. The peg array assembly of paragraph A13, wherein the at least one template is configured to be contained and stored within the internal volume.

A15. The peg array assembly of any of paragraphs A13-A14, wherein the at least one template is configured to be stored between a/the lower housing and a/the light and battery assembly.

A16. The peg array assembly of any of paragraphs A13-A15, wherein a respective template of the at least one template is configured to be positioned on an/the upper sheet surface of an/the elastomeric sheet to instruct as to suggested placement of the plurality of light-transmitting pegs through a respective plurality of slits of the elastomeric sheet and through a respective plurality of apertures of the panel.

A16.1. The peg array assembly of any of paragraphs A13-A15, wherein a respective template of the at least one template is configured to be positioned on an/the upper panel surface of the panel to instruct as to suggested placement of the plurality of light-transmitting pegs through a respective plurality of slits of the elastomeric sheet and through a respective plurality of apertures of the panel.

A16.2. The peg array assembly of paragraph A16.1, wherein a respective template of the at least one template is configured to be positioned on the upper panel surface of the panel to instruct as to suggested placement of the plurality of light-transmitting pegs through a respective plurality of slits of the elastomeric sheet, through a respective plurality of apertures of the panel, and through a respective plurality of apertures of a/the second panel.

A16.3. The peg array assembly of any of paragraphs A13-A16.2, wherein the at least one template comprises a plurality of template apertures, wherein each respective template aperture is configured to receive a respective light-transmitting peg therethrough, and wherein each respective template aperture is configured to align with a corresponding respective aperture of the panel and/or a corresponding respective aperture of the second panel.

A16.4. The peg array assembly of paragraph A16.3, wherein at least some template apertures of the plurality of template apertures each comprises a respective color indication ring encircling the respective template aperture, wherein each respective color indication ring is configured to indicate a recommended color of light-transmitting peg to be inserted through the respective template aperture encircled by the respective color indication ring.

A16.5. The peg array assembly of any of paragraphs A13-A16.4, wherein the at least one template comprises laminated paper.

A17. The peg array assembly of any of paragraphs A1-A16.5, further comprising a/the plurality of light-transmitting pegs.

A18. The peg array assembly of paragraph A17, wherein at least some of the plurality of light-transmitting pegs are substantially clear.

A19. The peg array assembly of any of paragraphs A17-A18, wherein the plurality of light-transmitting pegs comprise a plurality of different colors.

A20. The peg array assembly of any of paragraphs A17-A19 wherein each light-transmitting peg of the plurality of light-transmitting pegs comprises a tapered shaft portion and a head portion.

A20.1. The peg array assembly of paragraph A20, wherein the tapered shaft portion is configured to be selectively and removably inserted through a respective slit of a/the elastomeric sheet, through a respective aperture of the panel, and/or through a respective aperture of a/the second panel.

A20.2. The peg array assembly of paragraph A20 or A20.1, wherein the head portion is sized such that it is configured to prevent insertion of the head portion through a/the respective aperture of the panel, such that the head portion is configured to remain visible through an/the opening of the housing when the light-transmitting peg is inserted through the respective aperture of the panel.

A21. The peg array assembly of any of paragraphs A17-A20.2, wherein the plurality of light-transmitting pegs are configured to be stored in the internal volume defined by the housing.

A22. The peg array assembly of any of paragraphs A17-A21, wherein the peg array assembly is configured such that the plurality of light-transmitting pegs may be stored between a/the light and battery assembly and an/the internal surface of the housing.

A23. The peg array assembly of any of paragraphs A1-A22, wherein the peg array assembly is configured to receive the mobile device in the form of a mobile phone, a tablet, or other light-emitting device.

A23.1. The peg array assembly of any of paragraphs A1-A23, wherein the peg array assembly is configured to support the mobile device such that light emitted from a screen of the mobile device is directed towards a/the lower panel surface of the panel and through the plurality of apertures of the panel.

A23.2. The peg array assembly of any of paragraphs A1-A23.1, wherein the peg array assembly is configured to support the mobile device such that light emitted from a screen of the mobile device is directed towards and through the plurality of apertures of the panel, and towards and through a/the plurality of apertures of a/the second panel.

A23.3. The peg array assembly of any of paragraphs A1-A23.2, wherein the housing is configured to receive and support the mobile device.

A23.4. The peg array assembly of any of paragraphs A1-A23.3, wherein a cover of the peg array assembly is configured to receive and support the mobile device.

A24. The peg array assembly of any of paragraphs A1-A23.4, further comprising a handle that is configured to allow the peg array assembly to be carried as a singular self-contained unit.

A25. The peg array assembly of any of paragraphs A1-A24, further comprising a/the cover configured to close an/the opening of the housing, thereby enclosing the internal volume between the cover and the housing.

A26. The peg array assembly of paragraph A25, wherein at least a portion of the cover is translucent or transparent.

A27. The peg array assembly of any of paragraphs A25-A26, wherein the cover comprises a/the handle.

A28. The peg array assembly of any of paragraphs A25-A27, wherein the cover is configured to accommodate a/the plurality of light-transmitting pegs inserted through the panel when the cover is coupled to the housing, such that the cover is configured to be selectively placed onto the housing to close an/the opening of the housing without needing to remove the plurality of light-transmitting pegs from the panel.

A29. The peg array assembly of any of paragraphs A1-A28, further comprising an adjustment mechanism configured to be selectively adjusted to configure the peg array assembly to receive a plurality of different sizes of mobile devices.

B1. A mobile app configured for use on a mobile device positioned in the peg array assembly of any of paragraphs A1-A29.

B2. The mobile app of paragraph B1, wherein the mobile app is configured to receive and/or detect an internet location.

B3. The mobile app of any of paragraphs B1-B2, wherein the mobile app is configured to retrieve and/or access an animation library from a remote location.

B4. The mobile app of paragraph B3, wherein the mobile app is configured to receive a user selection designating a user-selected animation from among a plurality of animations of the animation library.

B5. The mobile app of paragraph B4, wherein the mobile app is configured to display the user-selected animation on a screen of the mobile device.

B6. The mobile app of any of paragraphs B1-B5, wherein the mobile app is configured to receive a plurality of user-selected settings.

B7. The mobile app of any of paragraphs B1-B6, wherein the mobile app is configured to retrieve and/or access a template library from a remote location.

B8. The mobile app of paragraph B7, wherein the mobile app is configured to receive a user selection designating a user-selected template from among a plurality of templates of the template library.

B9. The mobile app of paragraph B8, wherein the mobile app is configured to display the user-selected template on a/the screen of the mobile device.

B10. The mobile app of any of paragraphs B1-B9, wherein the mobile app comprises a template mode and an animation mode, wherein the mobile app is configured to display a design template in the template mode, and wherein the mobile app is configured to display an animation in the animation mode.

B11. The mobile app of any of paragraphs B1-B10, wherein the mobile app is configured to download one or more design templates to the mobile device for offline use.

B12. The mobile app of any of paragraphs B1-B11, wherein the mobile app is configured to download one or more animations to the mobile device for offline use.

B12.1. The mobile app of any of paragraphs B1-B12, wherein the mobile app is configured to stream one or more animations to the mobile device.

B13. The mobile app of any of paragraphs B1-B12.1, wherein the mobile app is configured to display a suggested placement of a plurality of light-transmitting pegs.

B14. The mobile app of any of paragraphs B1-B13, wherein the mobile app is configured to play audio sounds, sound effects, and/or music while animating and/or emitting light towards the peg array assembly.

C1. A system, comprising:
 the peg array assembly of any of paragraphs A1-A29; and
 a mobile app configured to control the intensity, brightness, and/or color of light emitted by the mobile device towards the panel.

C2. The system of paragraph C1, wherein the mobile app is configured to control and emit different light having different characteristics at different points in time and/or in different locations of the mobile device, such that the mobile app is configured to work together with the mobile device and the plurality of light-transmitting pegs to create an animated display viewable through an/the opening of the housing.

C3. The system of paragraph C1 or C2, wherein the mobile app comprises the mobile app of any of paragraphs B1-B14.

D1. A method, comprising providing a mobile app for use on a mobile device configured for use in the peg array assembly of any of paragraphs A1-A29.

D2. The method of paragraph D1, further comprising receiving or detecting an internet location via the mobile app run on the mobile device.

D3. The method of any of paragraphs D1-D2, further comprising retrieving or accessing an animation library from a remote location, via the mobile app.

D4. The method of paragraph D3, further comprising receiving a user selection designating a user-selected animation from among a plurality of animations of the animation library, via the mobile app.

D5. The method of paragraph D4, further comprising displaying the user-selected animation on a screen of the mobile device, via the mobile app.

D6. The method of any of paragraphs D1-D5, further comprising receiving a plurality of user-selected settings via the mobile app.

D7. The method of any of paragraphs D1-D6, further comprising retrieving or accessing a template library from a remote location, via the mobile app.

D8. The method of paragraph D7, further comprising receiving a user selection designating a user-selected template from among a plurality of templates of the template library, via the mobile app.

D9. The method of paragraph D8, further comprising displaying the user-selected template on a/the screen of the mobile device, via the mobile app.

D10. The method of any of paragraphs D1-D9, further comprising changing modes in the mobile app between a template mode and an animation mode, wherein the mobile app is configured to display a design template in the template mode, and wherein the mobile app is configured to display an animation in the animation mode.

D11. The method of any of paragraphs D1-D10, further comprising downloading one or more design templates for offline use, via the mobile app.

D12. The method of any of paragraphs D1-D11, further comprising downloading one or more animations for offline use, via the mobile app.

D13. The method of any of paragraphs D1-D12, further comprising placing the mobile device in the housing of the peg array assembly.

D14. The method of any of paragraphs D1-D13, further comprising displaying a suggested placement of a plurality of light-transmitting pegs, via the mobile app.

E1. A method, comprising:
  removing a plurality of light-transmitting pegs from an internal volume of the peg array assembly of any of paragraphs A1-A29;
  inserting a plurality of respective light-transmitting pegs through a respective slit of a/the elastomeric sheet and through a respective aperture of the panel; and
  directing light towards a/the lower panel surface of the panel such that the light is transmitted through the plurality of respective light-transmitting pegs and visible through an/the opening of the housing.

E1.1. The method of paragraph E1, wherein the inserting the plurality of respective light-transmitting pegs further comprises inserting the plurality of respective light-transmitting pegs through a respective aperture of a/the second panel of the peg array assembly.

E2. The method of paragraph E1 or E1.1, further comprising separating an/the upper housing from a/the lower housing of the peg array assembly.

E3. The method of paragraph E2, wherein the separating the upper housing from the lower housing comprises disengaging a latch, actuating a mechanical release, and/or pressing a component out of a detent.

E4. The method of any of paragraphs E2-E3, further comprising coupling the upper housing to the lower housing, wherein the coupling the upper housing to the lower housing is performed before the inserting the plurality of light-transmitting pegs.

E5. The method of any of paragraphs E1-E4, further comprising removing a/the cover from the housing, wherein the removing the cover is performed before the inserting the plurality of light-transmitting pegs.

E5.1. The method of paragraph E5, further comprising placing a/the panel subassembly of the peg array assembly into the cover such that the cover supports the panel subassembly above a/the light and battery assembly of the peg array assembly or above the mobile device.

E6. The method of any of paragraphs E1-E5.1, further comprising selecting a design template from among a plurality of design templates stored in the internal volume of the peg array assembly, wherein each respective design template of the plurality of design templates includes indicia representing positions and colors for placement of a plurality of light-transmitting pegs.

E7. The method of paragraph E6, further comprising placing the design template adjacent an/the upper sheet surface of the elastomeric sheet such that the elastomeric sheet is positioned between the selected design template and the panel, wherein the placing the selected design template is performed prior to the inserting the plurality of light-transmitting pegs, and wherein the inserting the plurality of light-transmitting pegs further comprises inserting the plurality of light-transmitting pegs through the design template.

E7.1. The method of paragraph E6, further comprising placing the design template on an/the upper panel surface of the panel, wherein the placing the selected design template is performed prior to the inserting the plurality of light-transmitting pegs, and wherein the inserting the plurality of light-transmitting pegs further comprises inserting the plurality of light-transmitting pegs through the design template.

E8. The method of any of paragraphs E1-E7.1, further comprising:
  removing a/the light and battery assembly from the peg array assembly; and
  placing a mobile device in the internal volume of the peg array assembly, wherein the directing light comprises emitting light from the mobile device.

E8.1. The method of any of paragraphs E1-E7.1, further comprising placing a mobile device in a/the cover of the peg array assembly, and wherein the directing light comprises emitting light from the mobile device.

E9. The method of paragraph E8 or E8.1, wherein the mobile device is a mobile phone, a tablet, or other smart device.

E10. The method of any of paragraphs E8-E9, further comprising removing the mobile device from the internal volume of the peg array assembly or from a/the cover of the peg array assembly.

E11. The method of any of paragraphs E1-E10, further comprising removing the plurality of the light-transmitting pegs from the apertures of the panel and from the slits of the elastomeric sheet.

E12. The method of any of paragraphs E1-E11, further comprising storing the plurality of light-transmitting pegs in the internal volume of the peg array assembly.

E13. The method of paragraph E12, wherein the storing the plurality of light-transmitting pegs comprises placing the plurality of light-transmitting pegs adjacent an/the internal surface of a/the lower housing.

E14. The method of paragraph E12 or E13, wherein the storing the plurality of light-transmitting pegs comprises placing the plurality of light-transmitting pegs with respect to a/the light and battery assembly such that the light and battery assembly serves to separate the plurality of light-transmitting pegs from the panel and/or a/the panel subassembly of the peg array assembly when the peg array assembly is fully assembled and in a closed configuration.

E15. The method of any of paragraphs E12-E14, wherein the storing the plurality of light-transmitting pegs comprises placing the plurality of light-transmitting pegs below a/the lower panel surface of the panel of the peg array assembly, such that the panel is configured to prevent the plurality of light-transmitting pegs from falling through the opening of the housing when the plurality of light-transmitting pegs are stored and the peg array assembly is in a/the closed configuration.

E16. The method of any of paragraphs E1-E15, further comprising accessing a template library and/or an animation library via the mobile device.

E17. The method of paragraph E16, wherein the accessing the template library and/or the animation library is performed using a QR code or other code configured to be scanned by the mobile device.

E18. The method of paragraph E16 or E17, wherein the accessing the template library and/or the animation library is performed via a mobile app on the mobile device.

E19. The method of any of paragraphs E1-E18, further comprising choosing an animation from among a plurality of different animations, using the mobile device.

E20. The method of any of paragraphs E1-E19, further comprising choosing settings from among a plurality of different settings, using the mobile device, wherein the plurality of different settings are configured to define the brightness and/or color of light emitted from the mobile device at various points in time.

E21. The method of any of paragraphs E1-E20, further comprising creating an animation using the mobile device and the plurality of light-transmitting pegs.

E22. The method of any of paragraphs E1-E21, wherein the plurality of light-transmitting pegs comprises solely clear light-transmitting pegs.

F1. The use of the peg array assembly of any of paragraphs A1-A29, or the system of any of paragraphs C1-C3 to display an image and/or an animation via the plurality of light-transmitting pegs and the light source and/or the mobile device.

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, a component being described as being positioned "on" another component may include face-sharing contact between the two components. As used herein, the term "adjacent" refers to being near or adjoining, but not necessarily touching. Adjacent structures can be spaced apart from one another or can be in actual contact with one another. In some instances, adjacent structures can be coupled to one another or can be formed integrally with one another.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

As used herein, a mobile device may be any suitable device or devices that are configured to perform the functions of the mobile device discussed herein. For example, the mobile device may include one or more of an electronic controller, a dedicated controller, a special-purpose controller, a personal computer, a mobile phone, a special-purpose computer, a display device, a logic device, a memory device, and/or a memory device having computer readable media suitable for storing computer-executable instructions for implementing aspects of systems, methods, and/or mobile apps according to the present disclosure.

Additionally or alternatively, the mobile device may be configured to read non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

The invention claimed is:

1. A peg array assembly, comprising:
 a housing comprising an opening, wherein the housing defines an internal volume; and
 a panel comprising a plurality of apertures formed therethrough, wherein the plurality of apertures are arranged in an array, wherein each aperture of the plurality of apertures is configured to receive a respective light-transmitting peg and retain the respective light-transmitting peg until the respective light-transmitting peg is selectively removed from the respective aperture, wherein the panel is positioned with respect to the housing such that the array of the plurality of apertures is configured to be accessible through the opening in the housing, and wherein the peg array assembly is configured to selectively receive a mobile device configured to emit light towards the array of the plurality of apertures.

2. The peg array assembly according to claim 1, further comprising:
 an elastomeric sheet comprising a plurality of slits formed therethrough; and
 a second panel comprising a second plurality of apertures, wherein the elastomeric sheet is sandwiched between the panel and the second panel to form a panel subassembly.

3. The peg array assembly according to claim 2, wherein each respective slit of the plurality of slits is configured to receive a respective light-transmitting peg therethrough, and wherein each respective slit of the plurality of slits is configured to be self-healing such that it closes back up when the respective light-transmitting peg is removed from the respective slit.

4. The peg array assembly according to claim 3, wherein each respective slit of the plurality of slits is sufficiently aligned with a respective aperture of the plurality of apertures in the panel and with a respective aperture of the second plurality of apertures of the second panel, such that the panel subassembly is configured to receive a plurality of light-transmitting pegs, with each respective light-transmitting peg being inserted substantially perpendicularly with respect to an upper panel surface of the panel, through a respective slit of the plurality of slits of the elastomeric sheet, and through a respective aperture of the plurality of apertures of the panel.

5. The peg array assembly according to claim 2, wherein the elastomeric sheet is configured to at least substantially prevent light from passing through the elastomeric sheet except through one or more light-transmitting pegs inserted through one or more respective slits of the elastomeric sheet.

6. A method, comprising:
 removing a plurality of light-transmitting pegs from the internal volume of the peg array assembly according to claim 5;
 inserting a plurality of respective light-transmitting pegs through a respective slit of the elastomeric sheet and through a respective aperture of the panel; and
 directing light towards a lower panel surface of the panel via a mobile device, such that the light is transmitted through the plurality of respective light-transmitting pegs and visible through the opening of the housing.

7. The method according to claim 6, wherein the plurality of respective light transmitting pegs are solely colorless light-transmitting pegs, and wherein the directing light towards the lower panel surface further comprises creating a multi-colored animation using the solely colorless light-transmitting pegs.

8. The peg array assembly according to claim 1, further comprising a light and battery assembly configured to be positioned within the internal volume, wherein the light and battery assembly is configured to be selectively removed from the internal volume without damaging the peg array assembly, wherein the light and battery assembly is configured to house a light source configured to emit light towards the array of the plurality of apertures, and wherein the light and battery assembly is further configured to house a battery configured to power the light source.

9. The peg array assembly according to claim 1, further comprising at least one design template conveying a suggested design for placement of at least some of a plurality of light-transmitting pegs, wherein the at least one design template is configured to be contained and stored within the internal volume, wherein the at least one design template comprises a plurality of template apertures extending therethrough, wherein each template aperture of the plurality of template apertures is configured to receive a respective light-transmitting peg therethrough, wherein the design template is configured to be placed on an upper panel surface of the panel, and wherein at least some respective template apertures of the plurality of template apertures comprises a respective color indication ring encircling the respective template aperture, to indicate a recommended color of light-transmitting peg to be inserted through the respective template aperture.

10. The peg array assembly according to claim 1, wherein at least some of a plurality of light-transmitting pegs are substantially clear, wherein each light-transmitting peg of the plurality of light-transmitting pegs comprises a tapered shaft portion and a head portion, wherein the tapered shaft portion is configured to be selectively and removably inserted through a respective slit of an elastomeric sheet and through a respective aperture of the panel, and wherein the head portion is sized such that it is configured to prevent insertion of the head portion through the respective slit of the elastomeric sheet and through the respective aperture of the panel, such that the head portion is configured to remain visible through the opening of the housing when the light-transmitting peg is inserted through the elastomeric sheet and the panel.

11. The peg array assembly according to claim 1, wherein a plurality of light-transmitting pegs are configured to be stored in the internal volume defined between an upper housing and a lower housing, when the plurality of light-transmitting pegs are not in use.

12. The peg array assembly according to claim 1, further comprising an adjustment mechanism configured to be selectively adjusted to configure the peg array assembly to receive and support a plurality of different sizes of mobile devices within the peg array assembly such that light emitted from a screen of the mobile device is directed towards a lower panel surface of the panel and through the plurality of apertures of the panel.

13. The peg array assembly according to claim 1, further comprising a handle (Original) that is configured to allow the peg array assembly to be carried as a singular self-contained unit.

14. The peg array assembly according to claim 1, further comprising a cover configured to close the opening of the housing, thereby enclosing the internal volume between the cover, and the housing, wherein at least a portion of the cover is translucent or transparent, and wherein the cover is configured to receive the mobile device and position the mobile device below the panel such that the mobile device is configured to emit light towards the panel and through the plurality of apertures.

15. A system, comprising:
the peg array assembly according to claim 1; and
a mobile app configured to control the intensity, brightness, and/or color of light emitted by the mobile device towards the panel.

16. The system according to claim 15, wherein the mobile app is configured to cause the mobile device to emit different light having different characteristics at different points in time and in different locations of a screen of the mobile device, such that the mobile app is configured to work together with the mobile device and a plurality of light-transmitting pegs to create an animated display viewable through the opening of the housing, and wherein the mobile app is configured to create a multi-colored animation via light emitted from the mobile device to create a multi-colored animation using solely colorless light-transmitting pegs.

17. A mobile app configured for use on a mobile device positioned in the peg array assembly according to claim 1, wherein the mobile app is configured to access an animation library, wherein the mobile app is configured to receive a user selection designating a user-selected animation from among a plurality of animations of the animation library, and wherein the mobile app is configured to display the user-selected animation on a screen of the mobile device.

18. A mobile app configured for use on a mobile device positioned in the peg array assembly according to claim 1, wherein the mobile app is configured to access a template library from a remote location, wherein the mobile app is configured to receive a user selection designating a user-selected template from among a plurality of templates of the template library, wherein the mobile app is configured to display the user-selected template on a screen of the mobile device.

19. A mobile app configured for use on a mobile device positioned in the peg array assembly according to claim 1, wherein the mobile app is configured to play user-selected audio sounds while displaying an animation.

20. A method, comprising:
providing a mobile app for use on a mobile device configured for use in the peg array assembly according to claim 1;
detecting an internet location via the mobile app run on the mobile device;
accessing a template library from a remote location, via the mobile app, while the mobile app is in a template mode, wherein the mobile app is configured to display a design template in the template mode;
receiving a user selection designating a user-selected template from among a plurality of design templates of the template library, via the mobile app; and
displaying the user-selected template on a screen of the mobile device, via the mobile app, wherein the displaying the user-selected template comprises displaying a suggested placement of a plurality of light-transmitting pegs.

21. The method of paragraph 20, further comprising:
changing modes in the mobile app between the template mode and an animation mode, wherein the mobile app is configured to display an animation in the animation mode; and
displaying a user-selected animation on the screen of the mobile device, via the mobile app.

\* \* \* \* \*